United States Patent
Quick et al.

(10) Patent No.: US 11,604,787 B2
(45) Date of Patent: *Mar. 14, 2023

(54) METHOD OF GENERATING GLOBALLY VERIFIABLE UNIQUE IDENTIFIERS USING A SCALABLE INTERLINKED BLOCKCHAIN STRUCTURE

(71) Applicant: Providentia Worldwide, LLC, Fredericksburg, VA (US)

(72) Inventors: S. Ryan Quick, Fredericksburg, VA (US); Armand Kolster, San Francisco, CA (US)

(73) Assignee: Providentia Worldwide, LLC, Fredericksburg, VA (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/097,081

(22) Filed: Nov. 13, 2020

(65) Prior Publication Data

US 2021/0157793 A1    May 27, 2021

Related U.S. Application Data

(63) Continuation of application No. 16/813,068, filed on Mar. 9, 2020, now Pat. No. 10,853,354, which is a
(Continued)

(51) Int. Cl.
*G06F 16/00*   (2019.01)
*G06F 16/23*   (2019.01)
(Continued)

(52) U.S. Cl.
CPC ............ *G06F 16/2379* (2019.01); *G06F 9/54* (2013.01); *G06F 16/1837* (2019.01);
(Continued)

(58) Field of Classification Search
CPC ............ G06F 16/2379; G06F 16/1837; G06F 16/9024; G06F 9/54; G06F 21/602; H04L 9/0637; H04L 9/30; H04L 9/50
See application file for complete search history.

(56) References Cited

U.S. PATENT DOCUMENTS

2017/0235970 A1    8/2017    Conner
2017/0329980 A1    11/2017   Hu et al.
(Continued)

FOREIGN PATENT DOCUMENTS

WO    WO 2018/004783 A1    1/2018

OTHER PUBLICATIONS

International Search Report and Written Opinion of the International Search Authority directed to related International Patent Application No. PCT/US2019/047670, dated Oct. 24, 2019, 8 pages.

*Primary Examiner* — Hung Q Pham
(74) *Attorney, Agent, or Firm* — Sterne, Kessler, Goldstein & Fox P.L.L.C

(57) ABSTRACT

This disclosure describes systems and methods for employing interlinking multiple independent and separately-scalable blockchains to create globally verifiable unique identifiers. The disclosed systems and methods facilitate the creation of the globally verifiable unique identifiers to a level of scalability unattainable without employing the underlying two-dimensional blockchain structure, metadata, and cryptographic information stored on the blockchain. Moreover, the system avoids collisions and name conflicts among the globally verifiable unique identifiers, supports post-creation verification of the globally verifiable unique identifiers, and provides a variety of ancillary functions using the globally verifiable unique identifiers.

20 Claims, 18 Drawing Sheets

Related U.S. Application Data continuation of application No. PCT/US2019/047670, filed on Aug. 22, 2019.

(60) Provisional application No. 62/721,889, filed on Aug. 23, 2018.

(51) Int. Cl.
| | |
|---|---|
| *G06F 9/54* | (2006.01) |
| *G06F 21/60* | (2013.01) |
| *H04L 9/06* | (2006.01) |
| *H04L 9/30* | (2006.01) |
| *G06F 16/182* | (2019.01) |
| *G06F 16/901* | (2019.01) |
| *G06F 16/27* | (2019.01) |
| *H04L 9/00* | (2022.01) |

(52) U.S. Cl.
CPC .......... *G06F 16/27* (2019.01); *G06F 16/9024* (2019.01); *G06F 21/602* (2013.01); *H04L 9/0637* (2013.01); *H04L 9/30* (2013.01); *H04L 9/50* (2022.05)

(56) References Cited

U.S. PATENT DOCUMENTS

| | | |
|---|---|---|
| 2018/0294957 A1 | 10/2018 | O'Brien et al. |
| 2019/0058581 A1 | 2/2019 | Wood et al. |
| 2019/0394046 A1 | 12/2019 | Su |
| 2020/0210413 A1 | 7/2020 | Quick et al. |

Model For 4 Way Shard Configuration For 100 Sub-Blockchains

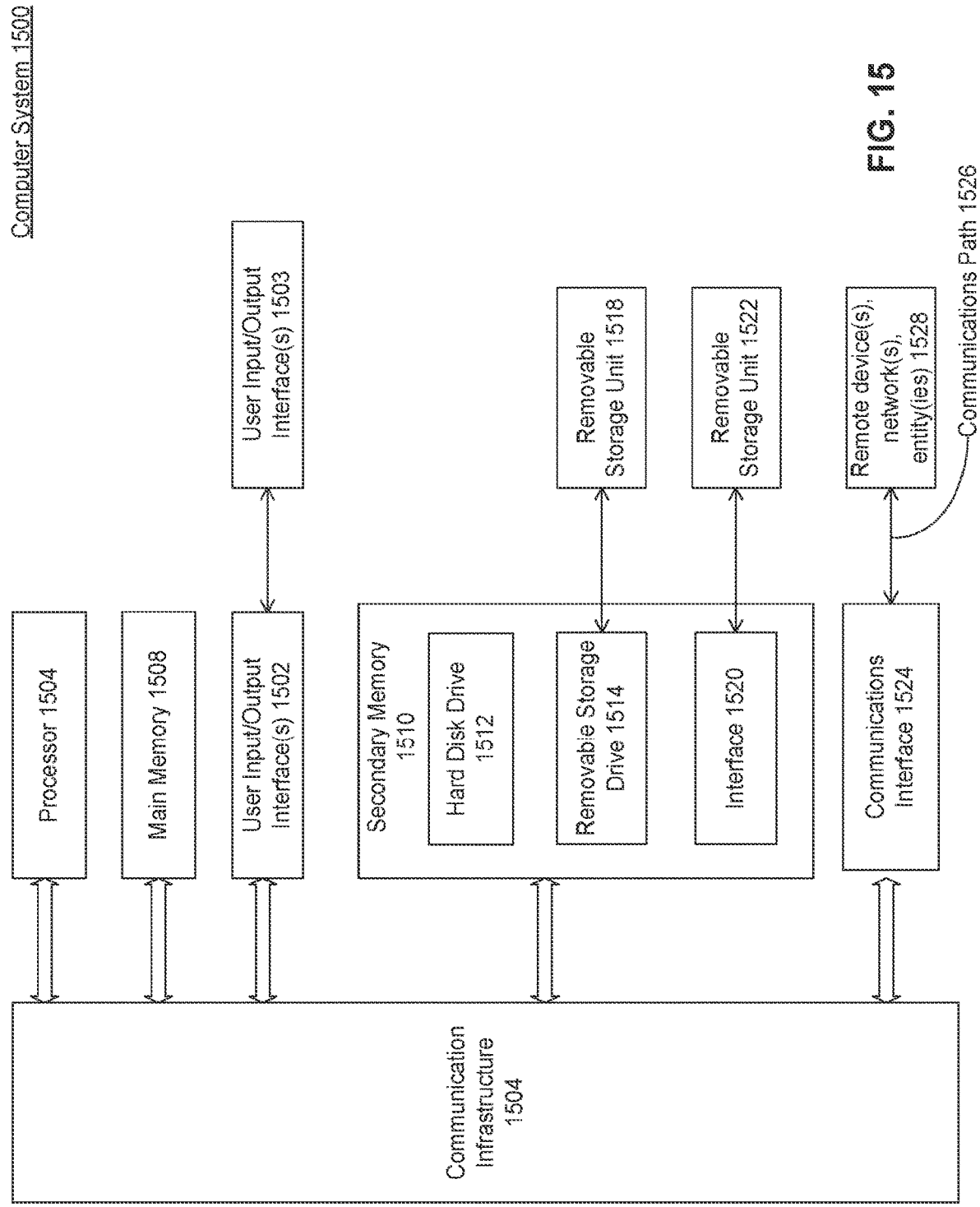

METHOD OF GENERATING GLOBALLY VERIFIABLE UNIQUE IDENTIFIERS USING A SCALABLE INTERLINKED BLOCKCHAIN STRUCTURE

CROSS REFERENCE

This Application is a continuation of U.S. patent application Ser. No. 16/813,068 entitled "Method of Generating Globally Verifiable Unique Identifiers Using a Scalable Interlinked Blockchain Structure," which is a continuation application International Application No. PCT/US2019/047670 entitled "Method of Generating Globally Verifiable Unique Identifiers Using a Scalable Interlinked Blockchain Structure," with an international filing date of Aug. 22, 2019, which claims the benefit of, and priority from, U.S. Provisional Patent Application No. 62/721,889, entitled "Systems and Methods for Blockchain Interlinking and Relationships," filed Aug. 23, 2018, all of which are incorporated herein by reference in their entirety.

BACKGROUND

One of the core problems with blockchain technologies, a form of distributed ledger technology ("DLT"), involves scalability and an inability to effectively search for entities along a single structure. Most of the underlying technology efforts focus on two objectives: ensuring that the verification of objects in the blockchain is handled securely and efficiently and providing network trust through egalitarian measures like decentralization at the expense of operational scalability. This disclosure outlines several approaches for making operational changes to blockchain management technologies to address these issues. These technology improvements are agnostic to the underlying blockchain implementations and offer means by which to integrate multiple different implementations.

BRIEF DESCRIPTION OF THE DRAWINGS/FIGURES

FIG. 15 is a block diagram illustrating an example computer system.

DETAILED DESCRIPTION

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

1 Multiple Blockchains Aggregated and Linked

This disclosure describes systems and methods for interlinking multiple independent and separately-scalable blockchains to provide transactional provenance. The disclosed systems and methods leverage a combination of blockchain and graph data structures in order to interoperate between blockchains without requiring a single data structure but still providing a single chain of custody and provenance for a particular set of actions. The disclosed systems and methods may also include and leverage relational data structures. These links are agnostic to the specific implementation of the underlying data structure, as long as the metadata is recorded as detailed in this disclosure. While this disclosure describes the systems and methods as using blockchain technology, other forms of distributed ledger technology may be employed, including directed acyclic graph ledgers, distributed coordinated synchronizers and file systems, ordered key-value stores, distributed relational database systems, and certified message delivery systems.

Figure 1:
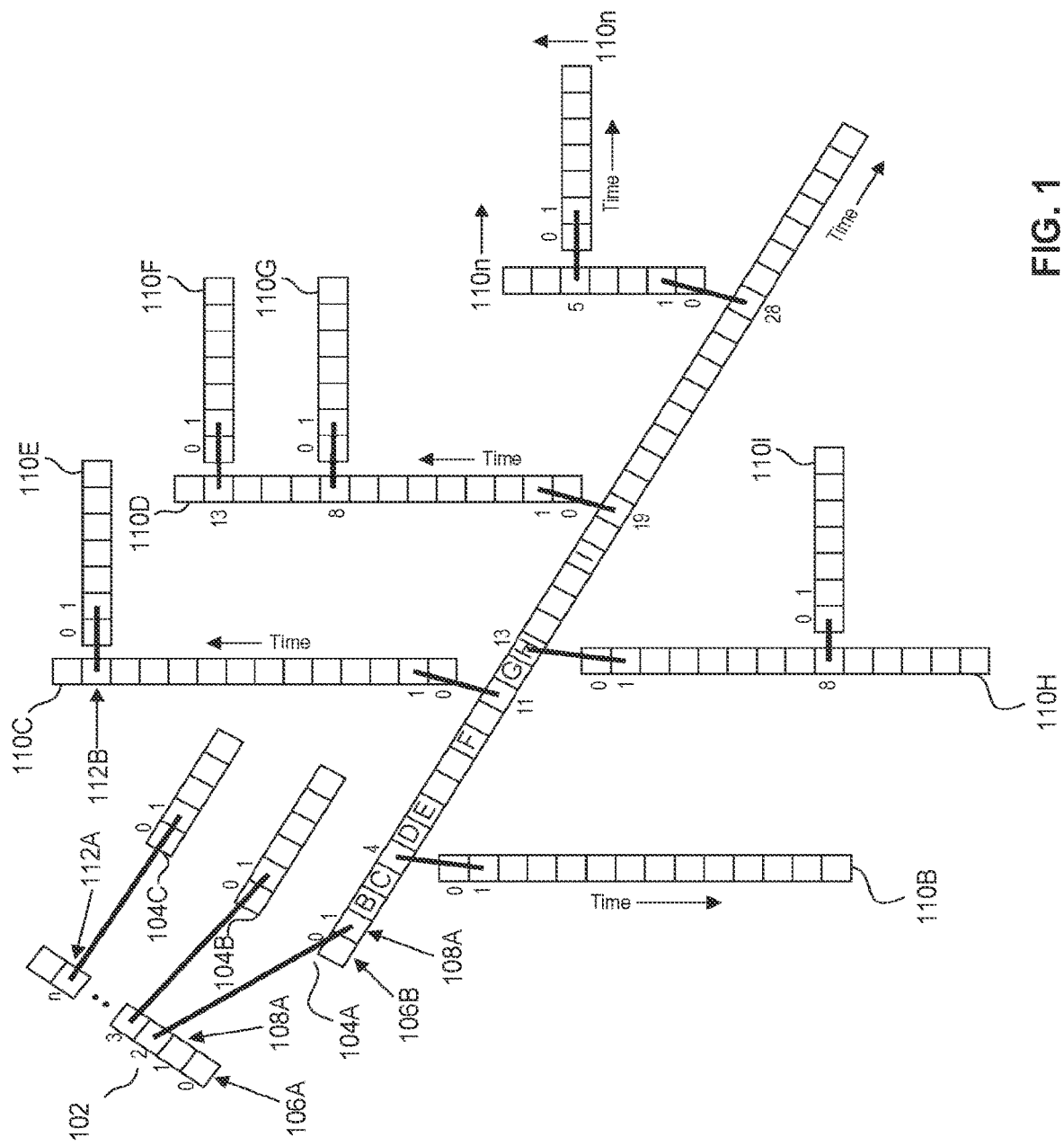
FIG. 1 illustrates an example N-Dimensional Blockchain Management Structure.

Disclosed herein and illustrated in FIG. 1, are systems and methods for maintaining a series of core blockchains, such as N-Dimensional blockchain structure 100, that maintain initial entities and their sub-blockchain links. In some embodiments, a blockchain is an implementation of a blockchain data structure that provides for provenance, is tamper-proof, and creates an append-only, immutable data format after consensus algorithms place the next block into the accepted blockchain. There are a variety of existing blockchains that meet these criteria, some of which include (but are not limited to) ETHEREUM, BITCOIN, DASH, RIPPLE, MONERO, TEZOS, EOS, CARDANO, HYPERLEDGER, MOVE, LIBRA, and/or R3. Within a specific implementation of blockchain, a block type is the descriptor of the type of transactions contained within a particular block. On many blockchains, this is a mixed combination of transaction types. Herein, a specific transaction type may (but does not necessarily) require its own block that can be described through internal or external mechanisms to the blockchain based on the implementation decisions at the time. Block types may be mixed within the same blockchain. Alternatively, blockchains may be separated or combined based on block type.

The process by which a blockchain data structure is governed and secured may be referred to, in some embodiments, as mining. Mining involves a process by which a collection of miners performs one or more of the following:
  a) Locate the next viable block in the blockchain.
  b) Fill that block with transactions according to the block type.
  c) Validate that those transactions are accurate, correct, secure, signed, attributed, and generally provide the necessary guarantees that ensure a valid transaction within that block type.
  d) Cement the block into the blockchain and control malleability according to the rules governing that blockchain.
  e) Provide a system of rewards for successful mining according to the rules and tokens governing that blockchain.

Mining may be performed by one or more miners. A miner may be a computer system that provides mining capabilities to a blockchain according to the rules governing that blockchain.

In some embodiments, an entity is any object that has attributes that describe its functionality and which participates in some transaction in time. An entity may be (but is not limited to) an actor (an actor entity), a relationship (a relationship entity), a value (a value entity), or a blockchain (a blockchain entity). This includes conventional concepts like actors, currencies, and behaviors, but also includes relationships, embodiments, transactional blockchains, and the like. In some embodiments a sub-blockchain is a blockchain which exists under the governance of an entity which exists on the blockchain from which the sub-blockchain spawns.

Figure 14:
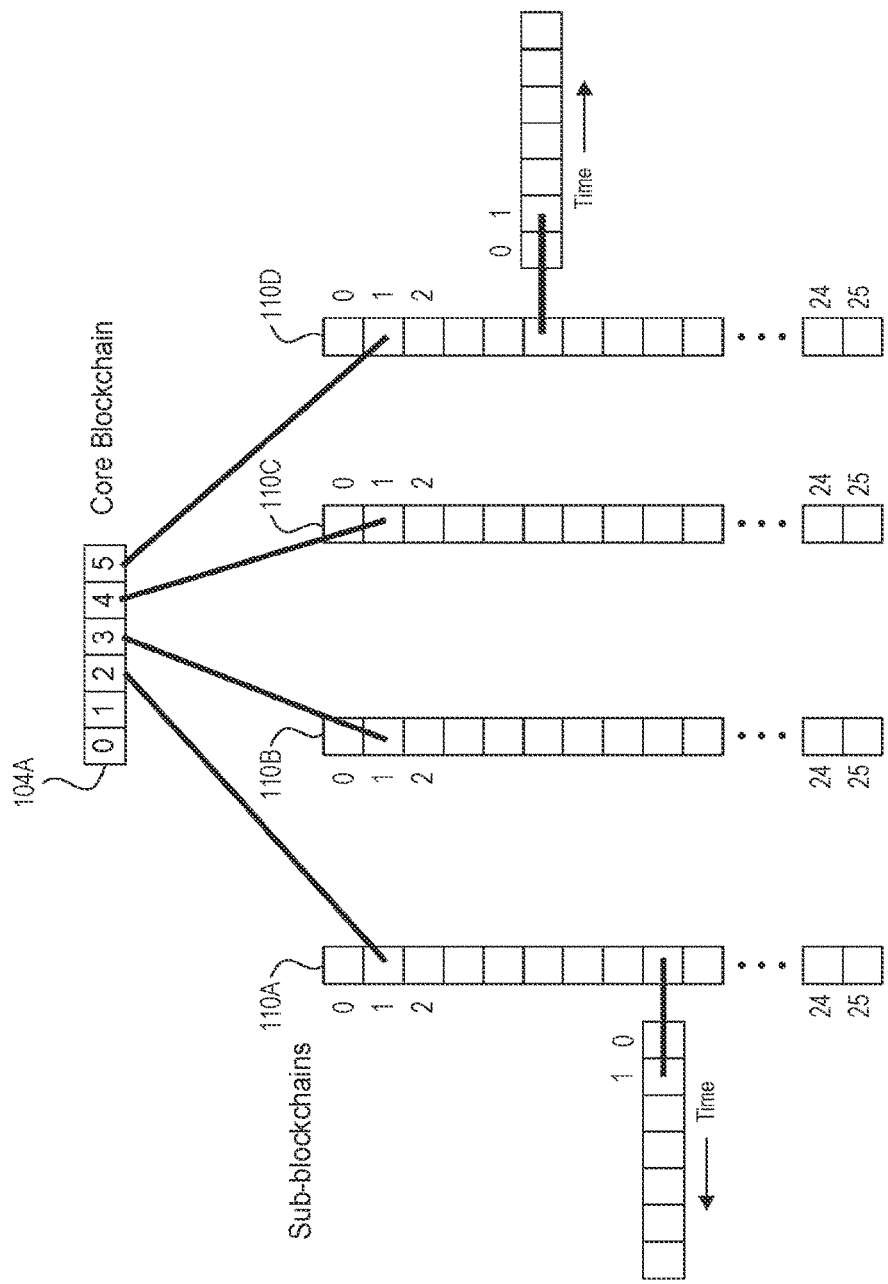
FIG. 14 is a diagram illustrating an example of blockchain sharding.

The transactional data in core blockchains, such as core blockchains 104, holds provenance for blockchain and entity creation. The systems and methods described herein may implement a series of shards by entity to create a parallel structure or structures that hold ordered history for the entities in its range. In a sharding scheme, horizontal partitioning of data may be achieved by deriving a shard key from the data of interest using algorithms such as but not limited to modulus, consistent hashing, or text mapping. Therefore, an entity range may be the governing subset of blockchains for which a particular core shard holds stewardship. For example, FIG. 14 illustrates 4-way shard configuration 1400 for one-hundred sub-blockchains. In this illustrative embodiment, the entity range for shard 1 may be sub-blockchains 01-25 and shard 2 may be sub-blockchains 26-50. In this example, shard 1 may have blockchain identifier 01-25, and shard 2 may have blockchain identifier 26-50. The range itself may thus be represented in the blockchain identifier, is self-evident, and does not require any external resources from that blockchain to understand the slice of history contained therein.

In cases where the entity range is not readily represented in the blockchain identifier, then the blockchain may record the entity range definitions in the linking and header blocks. For example, given a case where there are four shards, the entity ranges may be distributed in an external fashion, as by a load-balancer using a weighted round robin facility. In such an example, the rules governing owned blockchains may be stored in the blockchain itself. This manner of sharding through header and linking blocks may be used for load-balancing, dynamic provisioning, consensus agreements, programmatic outputs, arithmetic algorithms, parallel processing optimizations, workload dispersal methods, affinity rules, hashing and modulus algorithms, community detection, clustering algorithms, support vector machines, decision trees, computer learning methods, computer vision methods, artificial intelligence (AI), neural networks, sorting algorithms, or other distributed and parallel computing workload divisors.

As many core blockchains 104 as necessary may be created and may be continually added over time by adding additional entity ranges to track. This may ensure that there are never too many transactions against any particular blockchain to degrade performance. As an append-only data structure, one of the key operational difficulties with traditional blockchain systems is the increasing length of the blockchain over time. Traversal of very large blockchains is resource intensive and computationally expensive for many computer systems. Managing large blockchains can cause operational difficulty in ensuring consistent performance and reliability over time. Sharding core blockchains 104 improves both atomic reliability and overall transactional availability by maintaining shorter blockchains and providing a means to move new operations away from larger blockchains as operational requirements demand. The systems and methods described herein may leverage many blockchains to provide hundreds of thousands of transactions per second against N-Dimensional blockchain structure 100, even if actual usage is much lower. This represents a substantial increase in transaction speed over existing blockchain technologies.

In the systems and methods described herein, blockchain technologies are used as the system of record for behaviors. In some embodiments, a behavior is any sort of action that can be attributed to an entity. Behaviors are recorded on a blockchain. A behavior may be cached or hinted at by other mechanisms but must persist on a blockchain. This includes relationships. Relationship blockchains must be created before the associated link in the graph is recorded, because graph data structures may not effectively provide guaranteed temporal ordering. Which blockchain receives any particular behavioral transaction depends on the type, governance, and origin of the behavior itself. Associated links may provide performance and structure for describing relationships between entities and behaviors and may enhance transitional representations between governed blockchains.

1.1 Core Blockchains 1.1.1 Blockchain Description

Core blockchains 104 may record header blocks, entity information, and blockchain links. This information may be intermixed into the same block or separated into distinct block types, e.g., core blockchain 104A, core blockchain 104B, and core blockchain 104C of FIG. 1. Governance blockchain 102 of FIG. 1 may govern core blockchain 104A, core blockchain 104B, and core blockchain 104C. In some embodiments, on a new blockchain, a header block, such as header blocks 108, is the block immediately following a genesis block, such as genesis blocks 106. Headers blocks 108 may hold metadata about the new blockchain itself, which may include, but is not limited to, reference to the linking block on governance blockchain 102, sharding implementation, currency or trading token, block type, value token, transactional cost, transactional hints, source and destination data types, source and destination repository types, etc. Genesis blocks 106 may be the initial block on a blockchain. For example, in core blockchain 104A of FIG. 1, the block labeled "0" is the genesis block of core blockchain 104A, and the block labeled "1" is the header block of core blockchain 104A.

A link represents a relationship and may be recorded in a graph database as an edge between two nodes, which is the typical data relationship in graph structures. In N-Dimensional blockchain structure 100 of FIG. 1, links are illustrated by the lines connecting the individual blockchains. For example, FIG. 1 illustrates a link between governance blockchain 102 and core blockchain 104A. In some embodiments, on a governance blockchain, a linking block is the block that contains reference information to jump to a new sub-blockchain. This metadata may include, but is not limited to, the new genesis block, blockchain identifier, sharding implementation, and owning entity for the sub-blockchain. The genesis block identifier may also be recorded as part of the metadata in the linking block on a governance blockchain. FIG. 1 also illustrates linking blocks. For example, block "2" of governance blockchain 102 is a linking block, which is linked to header block (block "1") of core blockchain 104A.

Figure 10:
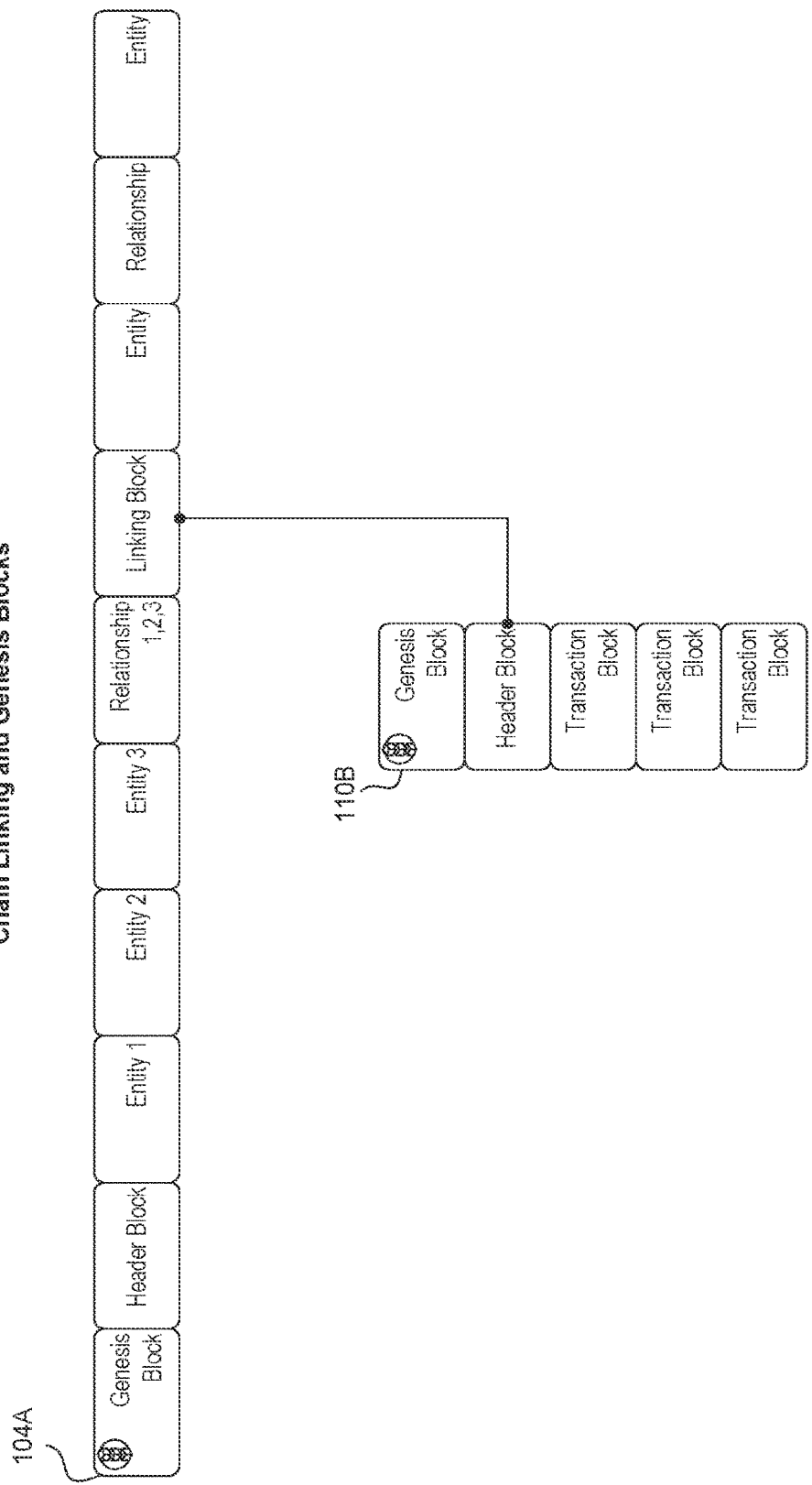
FIG. 10 is a diagram illustrating an example of blockchain linking and genesis blocks.

FIG. 10 illustrates the behavior of linked blockchain 1000 and the behavior of linking blocks and genesis blocks between a core blockchain, such as core blockchain 104A, and a sub-blockchain, such as sub-blockchain 110B, which is governed from core blockchain 104A. The linking block in core blockchain 104A and the header block in sub-blockchain 110B may contain the same information used to explain the relationship, governance, and structure of the two related blockchains. In this example, sub-blockchain 1110B is subordinate to core blockchain 104A. The header block in sub-blockchain 110B immediately follows its genesis block. Sub-blockchains may function independently from their governing core blockchains for behavior and performance. Governance of a chain may include provenance and end-to-end behavior transaction traversal, but may not impede or influence the transactional nature or functionality of a governed sub-blockchain after the initial creation of said sub-blockchain.

Entity information within core blockchains 104 may include entity attributes that describe the entity including (but not limited to) entity type, entity token, entity creation timestamp, entity creation endpoint, entity creation transaction, observational records, and the like. Core blockchains 104 may provide history for the entities in their ranges and origin for sub-blockchains 110 that link from core blockchains 104. Observational records may vary by use case, but core blockchains 104 may provide a starting point for bringing the history of an entity into the blockchain where there is no prior history. Once in the blockchain, then the blockchains themselves provide ordering, but observational details still provide useful information until that data is persisted and ordering negotiated through consensus. That is to say that event information and metadata such as timestamps, causes, effects, actors, locations, behaviors, relationships, observed changes, contain information which may be relevant to the relationships, entities, behaviors, tokens, and transactions in a blockchain. When moving transactions to a blockchain, then preserving observational data in the blockchain allows for provenance and relevant data security for events which occurred before the blockchain existed. In some embodiments, adding these metadata and event data to the blockchain directly following the creation of the blockchain preserve provenance for that data after the context change to the blockchain.

In some embodiments, transactions for behavior by an entity occur only on sub-blockchains 110 based on governance and relationships (described in other sections). In some embodiments, there is a single exception: governance blockchain 102 may own and governs the creation of entities and blockchains and therefore transacts directly on core blockchains 104 for these actions only. Other governance behaviors may occur on related sub-blockchains. In these embodiments, governance also includes delineating the value token for the implementation of the blockchain management system. Alternatively, in other embodiments, a non-blockchain entity may be the source of governance, such as (but not limited to) relational data structures like sequence and unique tags, GVUIs, keys, values, direct delegation, configuration systems like directories, lookup tables, service announcements, election results, algorithmic and programmatic decisions, load balancers, traffic shapers, firewalls and routers, learning algorithms, rule-based systems, key stores, wallets, and exchange algorithms, cryptographic guarantees and provability, artificial intelligence decisions, and neural network convolutions and results.

Core blockchains 104 may leverage a single value or utility token determined at blockchain creation. In some embodiments, a value and a utility token are the same or similar. In other embodiments, a value token may be different than a utility token: a utility token may provide only the necessary fuel or power behind a behavior which is recorded in a blockchain, whereas a value token may provide for power behind a behavior and may acquire quantitative value in its own right, making the value token itself a desirable asset.

Some embodiments prevent altering the value token for a given blockchain, but behavior may move to additional or alternate value tokens by creating sub-blockchains 110 leveraging that value token. Core blockchains may be created with a specific value token that can be determined through referential query of the blockchain type. In some embodiments, the value token is included in the blockchain identifier.

1.1.2 Core Blockchain Usage

Core blockchains 104 may provide at least the following: ordered history for entity creation, ordered history for sub-blockchain creation, and base linking blocks for sub-blockchains 110, which may be created and embodied elsewhere (e.g., different memory locations). As described herein, entities may act in the World (actor entities), blockchains may record the behaviors of those actor entities (actors), and behaviors involving multiple actors or reciprocities may be recorded in blockchains allocated specifically for those purposes and codified as relationship entities. In this manner, behaviors themselves may become actors in the World (behavior entities) in that they make up actions that occur in the World and that, at the very least, include observable occurrences. In FIG. 10, sub-blockchain 110B may provide transactional data in a blockchain that captures the behavior in the relationship (behavior entity "Relationship 1, 2, 3") between entities 1, 2 and 3 (relationship entity 1,2,3) created on core blockchain 104A.

1.1.2.1 Ordered History for Entity Creation

Entities may have history prior to "coming to the blockchain." For example, this may be as long as an established actor or company with a rich history in the World through other recordable events (e.g., case law in the United States, supply chain records for a large manufacturing organization, transit records for a large shipping concern, patient data for health care providers, claims records for insurance providers, transactions records for securities trading, etc.). Alternatively, this may be as short as a notional relationship between two actors that is created simply because an entity joined the blockchain. For example, an entity A may have a policy through governance of its blockchain such that entity A observes all transactions that take place on the entire blockchain to provide an auditing capability to the blockchain itself. Thus any new entity B added to the blockchain automatically creates a relationship with entity A. This new relationship is an entity itself but only comes into existence once entity B joins the blockchain.

FIGS. 8A-D illustrate examples of logical behavior for several sample cases of relationship-transaction interaction using the systems and methods described herein. Each step illustrated in or described with respect to the example diagrams shown in the FIGS. (e.g., FIGS. 4, 5, 6, 7, 8A-D, and 9) may represent a computer-readable instruction stored on a computer-readable storage device (e.g., computer memory), which, when executed by a processor causes the processor to perform one or more operations.

1.1.2.2 Relationship-Transaction Interaction Examples

Figure 8A:
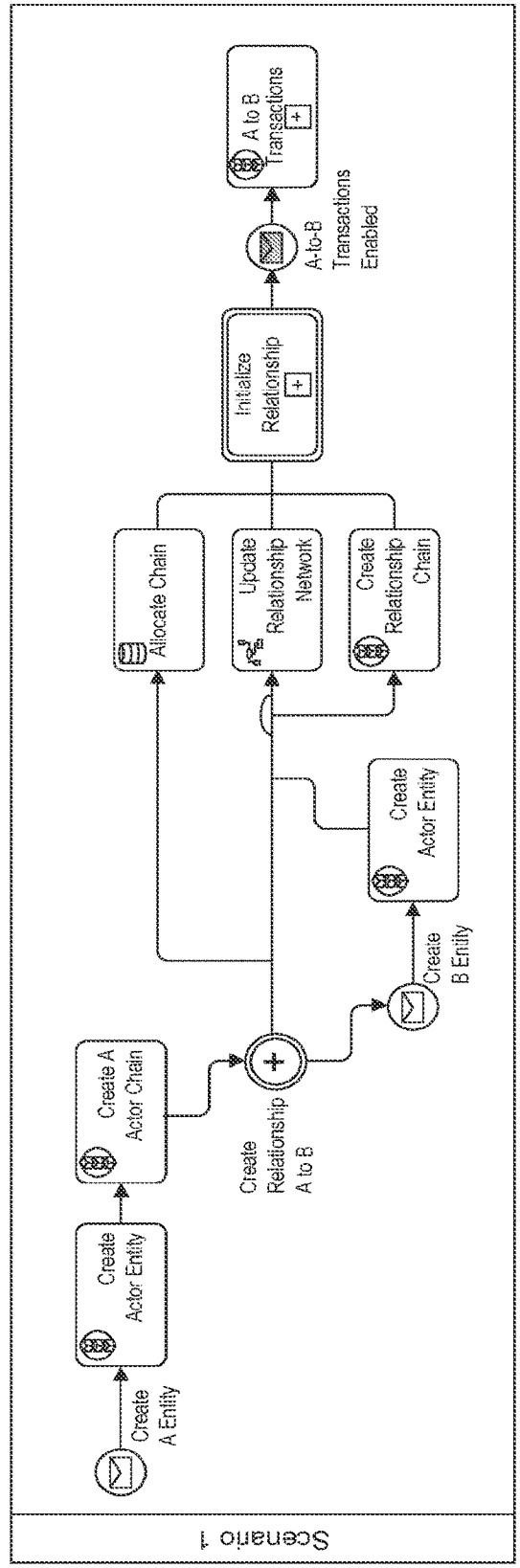
FIG. 8A is a diagram illustrating an example directed relationship-transaction interaction scenario for two entities.

FIG. 8A shows an example relationship-transaction interaction 800A for an actor A providing information to an actor B through a series of transactions. To create a relationship between A and B, a workflow first creates actor entity A on a blockchain, creates actor entity B on a later block on that blockchain, and then creates a relationship entity A-to-B on that blockchain. A second blockchain for A-to-B transactions is created once the relationship entity A-to-B exists to govern the A-to-B transactions sub-blockchain. The information provided from actor A to actor B comes in the form of transactions that are recorded on the A-to-B transactions sub-blockchain.

Figure 8B:
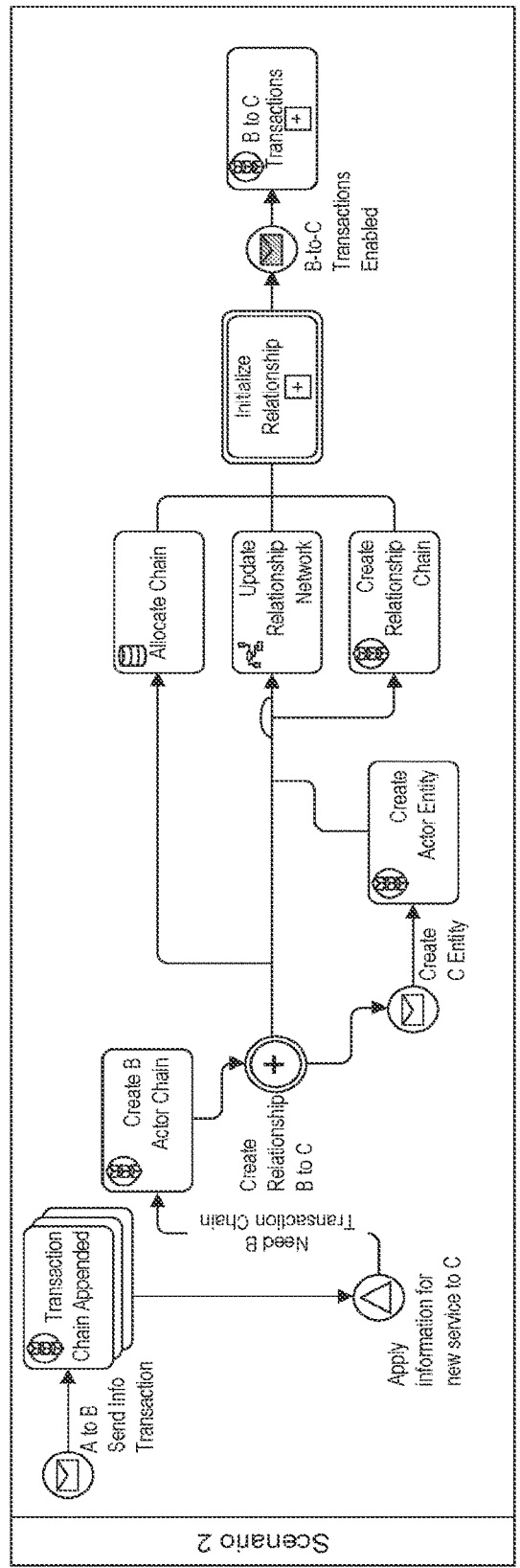
FIG. 8B is a diagram illustrating an example directed relationship-transaction interaction scenario for three entities.

FIG. 8B continues the example from FIG. 8A, showing an example relationship-transaction interaction 800B for an actor B who receives information in the form of blockchain transactions from an actor A on the A-to-B transactions blockchain, and then uses that information to provide a service to an actor C. On determining that a new service should be provided to actor C, actor B spawns a workflow to create actor entity C on actor B's blockchain. Once created, a process to create a relationship entity B-to-C is created on that same blockchain. A new sub-blockchain for B-to-C transactions, governed by the relationship entity B-to-C is formed to hold service events actor B performs for actor C, which are recorded as blockchain transactions on the B-to-C transactions sub-blockchain.

Figure 8C:
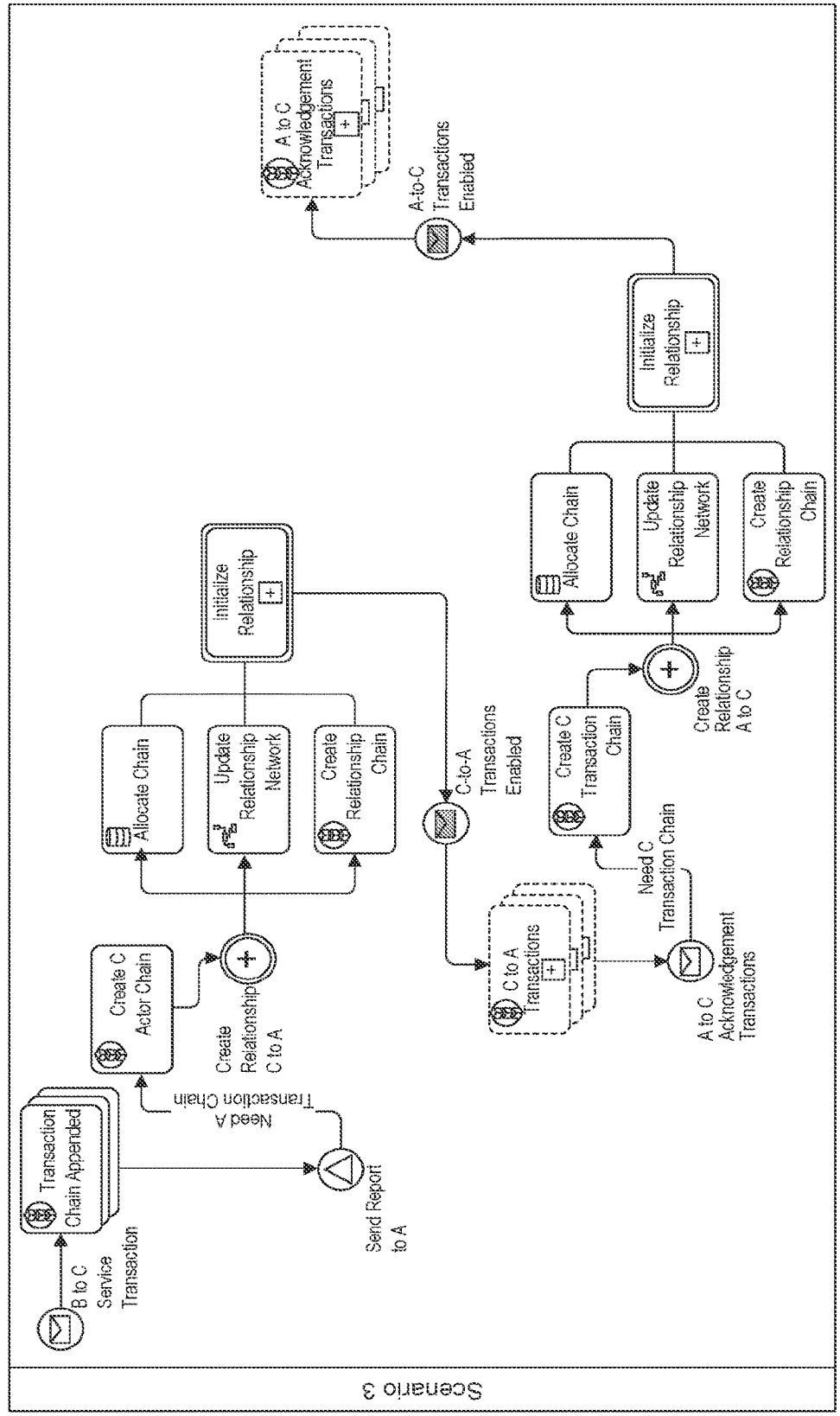
FIG. 8C is a diagram illustrating an example cyclic relationship-transaction interaction scenario for three entities.

FIG. 8C continues the examples from FIGS. 8A and 8B, showing an example relationship-transaction interaction 800C. In relationship-transaction interaction 800C, an actor C, who receives services from actor B recorded on a B-to-C sub-blockchain reports on the services rendered from actor B to an actor A. Actor A then acknowledges the report back to actor C. This forms a cyclical relationship between actors A, B, and C. Actor A provides information to actor B. Actor B provides a service to actor C, and actor C sends a report of services rendered to actor A, who in turn acknowledges receipt of the report back to actor C. To perform this acknowledgement, actor C creates an actor entity A on its blockchain. Following the workflow outlined in FIGS. 8A and 8B, actor C creates a relationship entity C-to-A on its blockchain. Next, the sub-blockchain C-to-A is formed to record reporting transactions to actor A. On receipt of the first C-to-A report event, actor entity A creates actor entity C on its blockchain and then instantiates the relationship entity A-to-C. Finally, the sub-blockchain A-to-C is created to record acknowledgement events from actor A to actor C, and the acknowledgment event flows back to actor C.

Figure 8D:
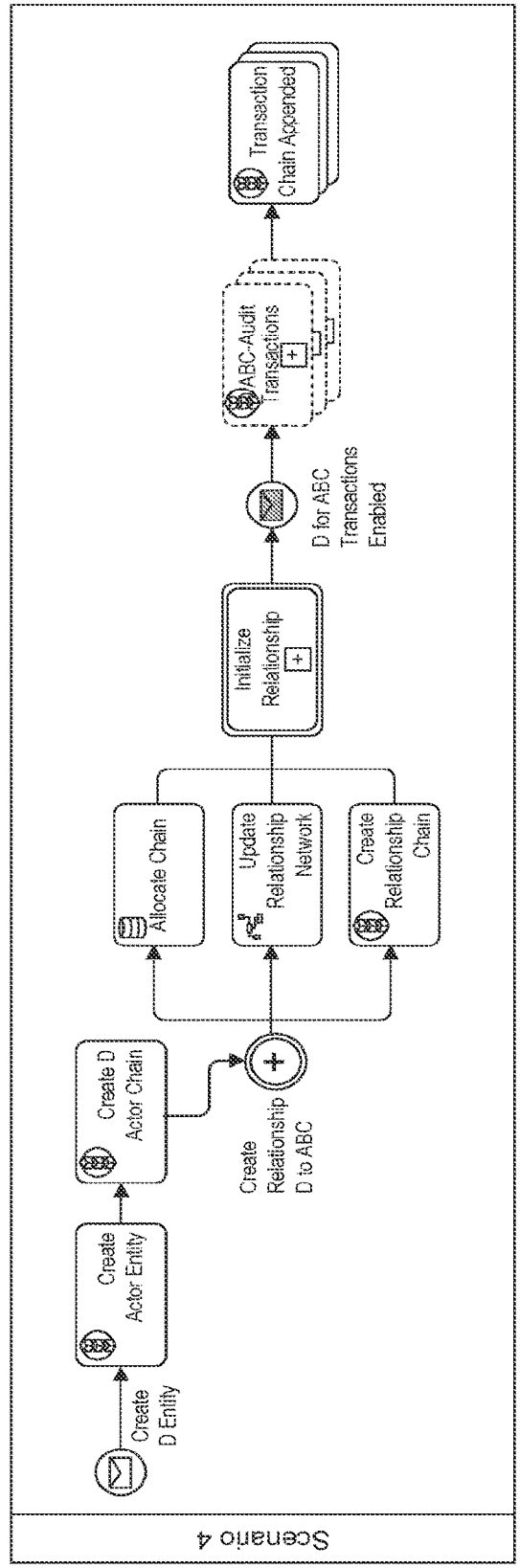
FIG. 8D is a diagram illustrating an example directed entity to grouped-entities relationship-transaction interaction scenario for four entities.

In FIG. 8D continues the examples from FIGS. 8A, 8B, and 8C, showing an example relationship-transaction interaction 800D. In relationship-transaction interaction 800D, actor D is responsible for accounting and auditing all of the behavior between actor entities A, B, and C. To do so, actor D creates a relationship entity ABC on its blockchain and creates a sub-blockchain D-to-ABC to record auditing and accounting activity. As audit and accounting events are received by actor D, they are recorded on the transaction sub-blockchain D-to-ABC. This diagram illustrates a single entity to multiple or grouped entities relationship to clarify that the governing entity for transaction sub-blockchains are relationship entities, not actor entities.

Figure 9:
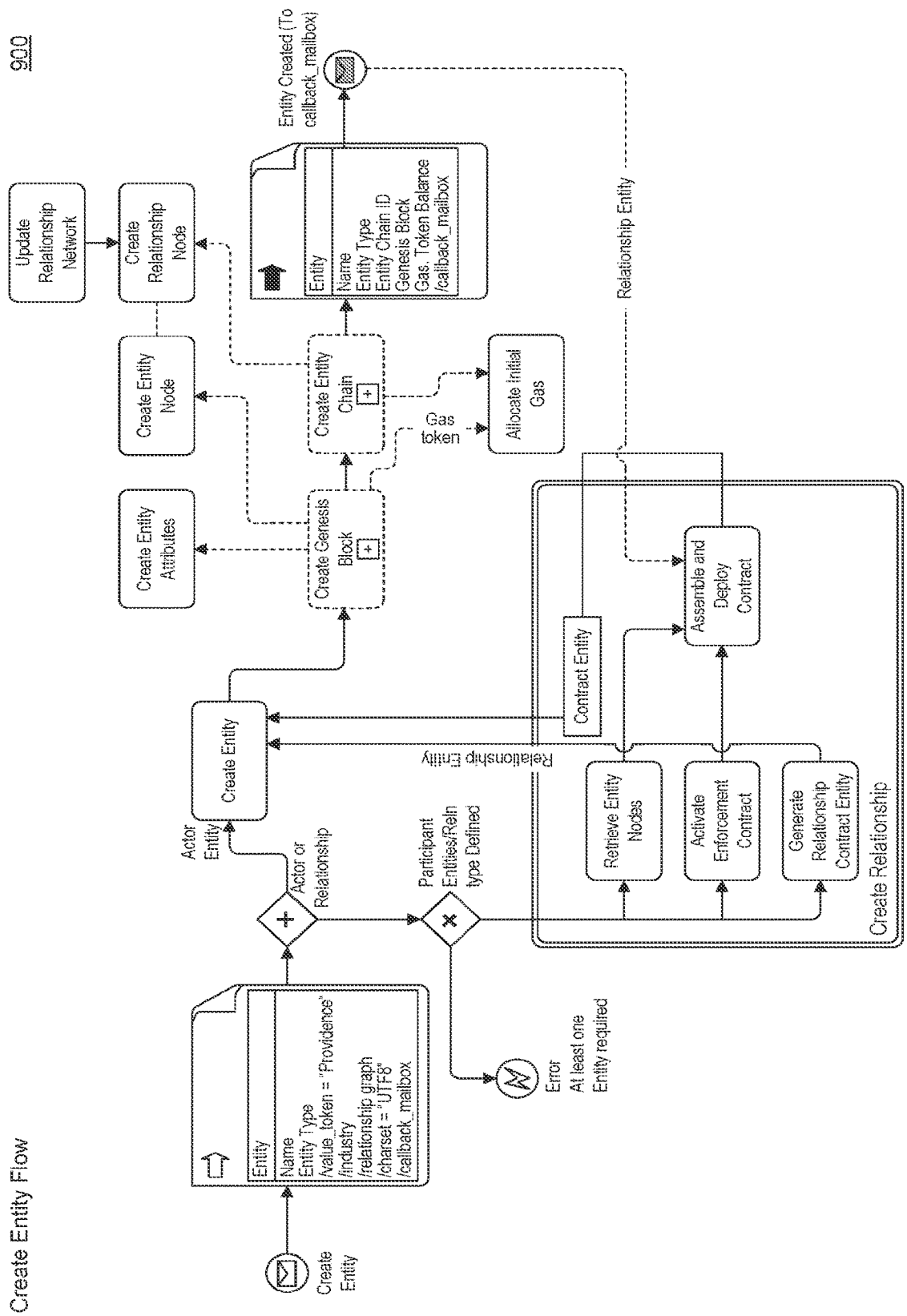
FIG. 9 is a diagram illustrating an example flow for entity creation.

Core blockchains 104 may provide a means to order the history of entity creation for the entire operational structure of the blockchain management system. Entities and their sub-blockchains may be the transactional components of core blockchains 104 and make up two distinct block types for core blockchains 104. In some embodiments, sub-blockchains 110 are created through linking blocks, such as linking blocks 112, that must consist of at least one governing entity. In some embodiments, all entities governing a linking block must exist on core blockchains 104 prior to a linking block that references them. Likewise, entities themselves may be ordered in their creation. In some embodiments, all actors are created prior to their behaviors and relationships. In a jointly-new transaction, the initiator may be recorded prior to the initiated, but the particular block persistence does not necessarily require the initiator to exist in a prior block. FIG. 9 shows an example process 900 for instantiating new core entities, their relationships to other entities, and their transactional blockchains.

1.1.2.3 Ordered History for Sub-Blockchain Creation

Sub-blockchains 110 may be created through genesis blocks, such as genesis blocks 106, on their new blockchains. This process is described later in this document. Core blockchains 104 may record the linking blocks for all sub-blockchains 110 that are spawned from entities on core blockchains 104. Linking blocks 112 may be appended to the specific blockchain that hosts the governing entity and may map to the sharding scheme adopted by the particular core blockchain in such a manner that the linking block lies in the same shard as the governing entity. In the case of multiple governing entities, multiple linking blocks may be created in each shard for the governing entity. Sub-blockchains mining may not occur in this case until all shards have acknowledged their relevant linking blocks through blockchain consensus mechanisms. In some embodiments, no sub-blockchain 110 may exist prior to the governing entity existence. In some multiple governing entities embodiments, sub-blockchain transactions may not begin until a quorum of sub-blockchain shards exist and that quorum has been acknowledged through consensus algorithms which may include weights, elections, allocations, promotions, defaults, etc.

1.1.2.4 Base Linking for Sub-Blockchains

When blockchains are created, a sharding implementation may be determined and recorded in the linking block of core blockchains 104 or governance blockchain 102 (e.g., when governance blockchain 102 is a transaction or relationship blockchain) and in the header block of the sub-blockchain (as described in more detail later). Linking blocks 112 may dictate at least the following: governing entities, value token(s) on the sub-blockchain, sharding implementations for sub-blockchains 110, sub-blockchain identifiers, and observational data. In some embodiments, linking blocks 112 are distinct block types and do not contain entity creation information. Each linking block among linking blocks 112 may be unique for a single sub-blockchain among sub-blockchains 110. In some embodiments, creating multiple sub-blockchains 110 in a single linking block is not permitted. In other embodiments, multiple sub-blockchains 110 may be created in a single linking block.

Once this nominal data is created, then the sub-blockchain may be instantiated as a link recorded in a graph data structure made up of the genesis block in the new blockchain, the linking block in the owning blockchain, and the nominal metadata stored in both block locations. The provenance for sub-blockchain creation may be maintained in both the owning and the newly created blockchains, with the relationship identifiers maintained in the graph data structure as graph nodes and edges.

1.1.2.5 Multilinked Blockchains

Figure 11:
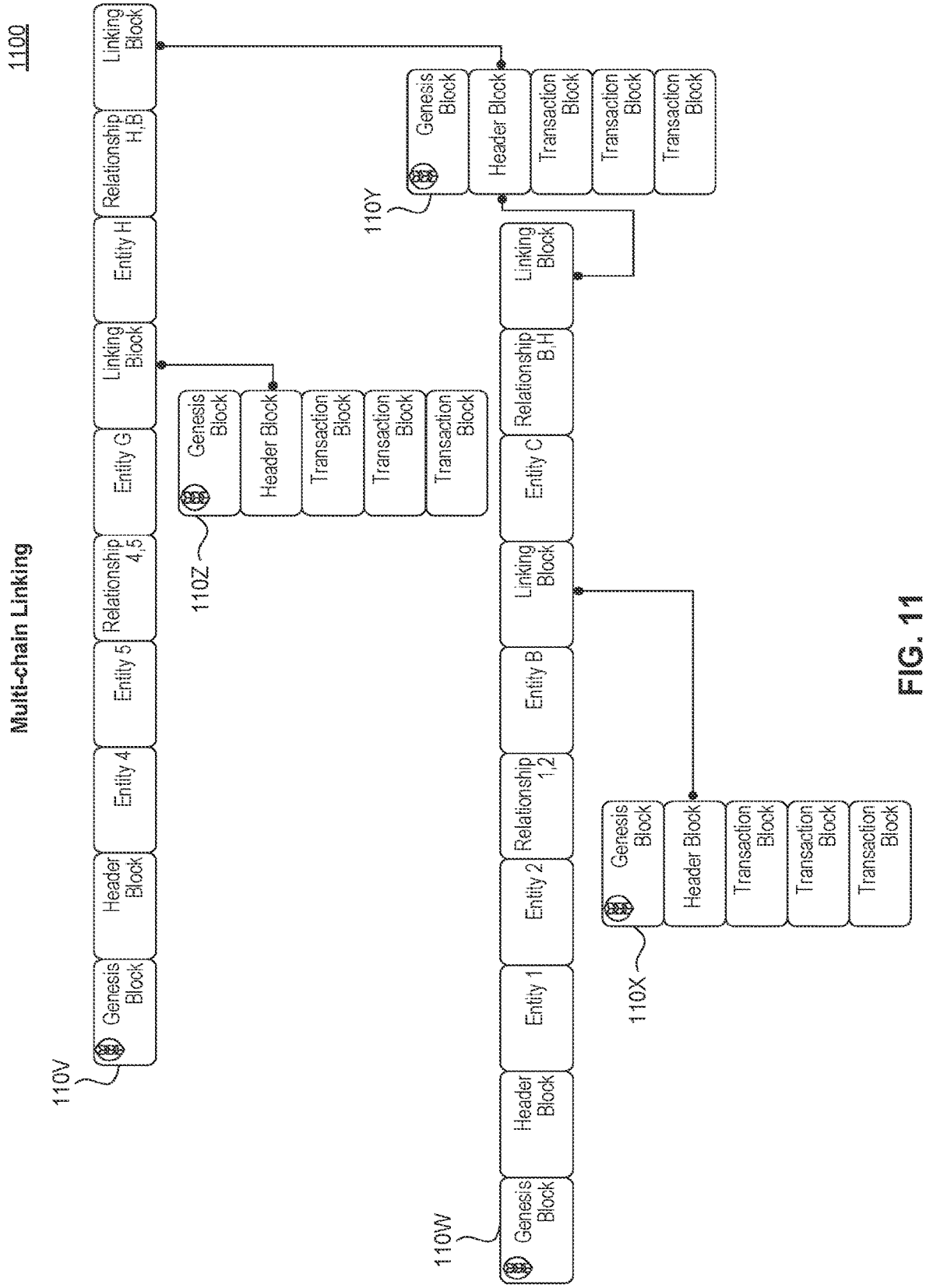
FIG. 11 is a diagram illustrating an example of multi-blockchain linking.

In a multilinked blockchain, governance may be shared between multiple core blockchains 104. In these multilinked blockchains, the owning entity is the relationship between entities on the core blockchain. FIG. 11 illustrates multilinking blockchains 1100. In this example, core blockchain 110W with entity B creates a relationship to core blockchain 110V's entity H. Core blockchain 110V creates a relationship to core blockchain 110W's entity B. In this embodiment, the governing entity is the union of core blockchain 110W's relationship with entity B, H; and core blockchain 110V's relationship with entity H, B. The structure of the linking block and header block contain the union information for these combined core blockchains and relationships.

1.1.2.6 Blockchain Purpose

In some embodiments, the primary function for blockchains is to provide storage and provenance for behavior transactions, relationships, and contracts. The notion of behavior includes not only the transacted work between entities, but also the recordation of the behavior of those entities as they change over time. By embedding both structures into the blockchain, the systems and methods described herein reliably capture an accurate view of the actor, the entities interacted, and the controls and behavior types for those interactions.

2 Discussion of Certain Aspects of Blockchain and Graph Technologies

A key issue or limitation with existing blockchain technology for recording behavior and relationships is its chained nature. Although following a track of actions logically proceeds along a temporal path, the relationships between entities are often not governed by time alone (or events at all) and so require additional notions of dependency, directionality, causation, implication, control and governance, ownership and sibling relationships. The structure of graph technology excels at providing robust access and storage of these sorts of vectorized communities. Thus, embodiments described herein employ graph technology to manage the linking between entities and links between blockchains. Using graph technology for vectorized relationship management provides the capability to maintain, order, and keep provenance for N-dimensional blockchain structures, such as N-Dimensional blockchain structure 100.

Conversely, graph technology is not good at providing linear or temporal provenance since there is no enforcement of such orders internally. Thus, embodiments described herein leverage the blockchain to provide this capability. Working in concert then, graph and blockchain technologies together provide both high performance and feature rich relationships with the provenance and chain of custody controls required for guaranteed ordering. Accordingly, embodiments disclosed herein form a system that leverages the benefits of both blockchain and graph technologies while avoiding their respective limitations.

Benefits of this fusion of blockchain and graph technologies include, but are not limited to, significant reduction in transaction times and significant increase in search speeds. Feature benefits include providing the capability for a graph, community, clustered, directed, cyclic, and acyclic networks to compare information temporally. For example, in a graph network describing the routes taken by taxis in New York City, it is not possible to compare the routes taken in the graph today with the graph as it existed yesterday, or the week before without having distinct copies of the graph yesterday and today. Adding blockchain provenance to this graph problem would allow queries and comparisons such as "how did the routes taken by medallion 3467 today compare with the same routes a week ago? 2 weeks ago? and a month ago?"

Adding graph technology to blockchains allows for multidimensional relationships to be retrieved without linear blockchain traversal. For long blockchains and for blockchains with a high transaction volume, retrieving related entities through searching or simple requests can take a long time. In many cases, traversing the number of blocks between two entities can require substantial input/output and computational resources on a computer. This time compounds for multi-dimensional relationships since that distance must be traversed repeatedly within the bounds of a single query. Graph technology excels at directed, point-to-point, point-to-multipoint, multipoint-to-multipoint, and community detection and clustering queries by optimizing the retrieval distances. (Indeed "shortest path" is a standard benchmark test for graph technology generally speaking.) Maintaining relationships in a graph where nodes are stored in the blockchain means that the systems and methods disclosed herein can retrieve the blocks with those nodes directly without traversing the chain at all. This may increase the atomic performance of these operations against the blockchain by orders of magnitude. Additionally, by maintaining relationships in graph structures, the system does not require the same blockchain, or same blockchain provider for node storage. The systems and methods do not require that a node reside in a blockchain, but could be in any form of retrievable storage including (but not limited to) other databases, files, key-value stores, programmatic outputs, constants, memory addresses and regions, hardware devices, key stores, and cryptographic wallets.

2.1 Additional Features and Capabilities

The following is a list of additional features and capabilities that may be implemented in the systems and methods disclosed above:

(1) The capability to provide provenance to relationship data. Specifically providing temporal history which is irrefutable, provable, non-repudiated to graph data that is verifiable and trustable independent from the content of that data itself or from the method by which that relationship data is stored, read, and manipulated.

(2) The capability to provide provenance between independently functioning blockchains. This includes public and private blockchains and does not depend on any particular implementation of blockchain technology on either end of the link. This includes disparate blockchains and dependent blockchains. This is independent of the data and purpose of the linked blockchains in question.

(3) The procedure for automatically electing a new pool of miners at the creation of a new blockchain is independent of the mining platform, the type or mechanism of the blockchain being created, or the intent and acceptance of any particular mining platform with an offer for a new blockchain. In some embodiments, the essential functions for new mining elections include:
  a) The procedure for electing, appointing or selecting miners for a new blockchain altogether;
  b) The capability to elect a new mining set, which then supervises and governs the blockchain miner pool creation in 3a;
  c) The capability to elect a new validator network with representative tokens, to create the new mining set as outlined in 3b for new blockchains in 3a.
(4) The capability to announce new concepts into consensus networks including, but not limited to:
  a) blockchains,
  b) miners,
  c) mining sets,
  d) tokens,
  e) validator networks,
  f) relationships,
  g) entities,
  h) elections,
  i) capabilities, and/or
  j) to govern their introduction to the running platform.
(5) The capability to provide Validator networks that may
  a) secure the blockchain,
  b) control the creation of relationships,
  c) verify and authenticate behavioral transactions,
  d) provide a common means of value exchange,
  e) provide a common means of network capability,
  f) provide trust and verifiability to network participants, and/or
  g) governs mining activity on the network.
(6) Customized consensus algorithms such as Proof-Of-Work, Proof-Of-Stake or Benefit-Of-Work, etc. that allow Validator networks to provide alternate mechanisms for verification, authentication, and proof of operational accuracy that may perform one or more of the following:
  a) Relate or pertain to behavioral transactions on the network,
  b) Increase or decrease distributed trust mechanisms on the network,
  c) Augment, streamline, or fan out transactions and content on the network, or
  d) Otherwise alter the means of participation in a manner that benefits or detriments the network and participants as needed and that may be governed through contractual elections as outlined by claim section 3.
  e) Increase the validity, accuracy, usability and provenance of the data involved in transactions on the network.

In the terms of this disclosure, "benefit" refers to improving the overall value of the data moving on a validated and verified network. This improved value may take the form of appreciating worth, monetary value, consistency, atomicity, clarity, verifiability, trust, importance, magnitude, knowledge, goodwill, validity, identity, or any other measurable change in value as observed by the network participants or by observers of the network.

These improvements may be considered Benefit-Of-Work or Benefit-Of-Stake validation. The current methods of mining blocks on blockchain implementations like ETHEREUM by Proof-Of-Work or Proof-Of-Stake use enormous computational power to solve cryptographical puzzles (Proof-Of-Work) or substantial capital investiture (Proof-Of-Stake), which end up validating the blocks through a consensus method. But the idea of Proof-Of-Work or Proof-Of-Stake is only inherently useful to the blockchain itself.

Benefit-Of-Work may designate an algorithm and verification process by which network participants demonstrate that they have improved the value (benefited) of a network. The manner and fashion of benefit may vary between embodiments, but the key notion is that the value of the network improves and so the value of network participation improves through a direct relationship with network improvement. Benefit-Of-Work may be used to replace or augment Proof-Of-Work in some blockchain embodiments.

Benefit-Of-Stake may designate an algorithm and verification process by which network participants demonstrate that they have improved the value (benefited) the participatory network stakes themselves. That is to say, that in traditional Proof-Of-Stake environments, the value of stakes may change as a function of network participation, where rewards and penalties are used to incentivize or disincentivize participants through a value system which is external to the network. For example, currency value may be the basis for network stakes, where participants place currency in escrow as their stake in participating in network validation. In these cases, the currency value functions outside the network itself and can therefore be said to hold "intrinsic value" for the staked participants. In a Benefit-Of-Stake implementation, some or all of the staked value derives from benefits to the network, network participation, or both. That is to say, network benefit increases the staked value directly from within the network itself as a result of operations designed specifically to improve the value of the network. The manner and fashion of benefit may vary between embodiments, but the key notion is that the value of the network improves and so the value of network participation improves through a direct relationship with network improvement. Benefit-Of-Stake may be used to replace or augment Proof-Of-Stake in some blockchain embodiments.

Proof-Of-Work may designate an algorithm and verification process by which network participants demonstrate that they have performed a particular computational work operation. These operations are used as mechanisms to demonstrate faithful participation in the blockchain validation process and in some embodiments provide the means by which the blockchain is extended and data added to the blockchain structure.

Proof-Of-Stake may designate an algorithm by which network participants demonstrate that they have a measurable vested interest in the correct validation, verification, and behavior of the blockchain structure. These vested interests ensure that transactions and data stored to the blockchain are correct and verifiable by other staked participants and in some embodiments provide the means by which the blockchain is extended and data added to the blockchain structure.

The Benefit-Of-Work or Benefit-Of-Stake model, described herein, would allow blockchain miners to do computational work that benefits the owner of a private blockchain or the stakeholders of a public blockchain instead of using the compute resources to just solve a cryptographical puzzle. The work that needs to be accomplished by the stakeholder can be integrated into the Benefit-Of-Work model and the miners would do the actual work as part of mining and validating the block. Generally, improvements to the transactions, content, relationships, entities, data validity or behaviors of the participant network would factor into the governance and security of the validator network core blockchain(s), sub-blockchain(s), and multilinked blockchain(s).

Figure 12:
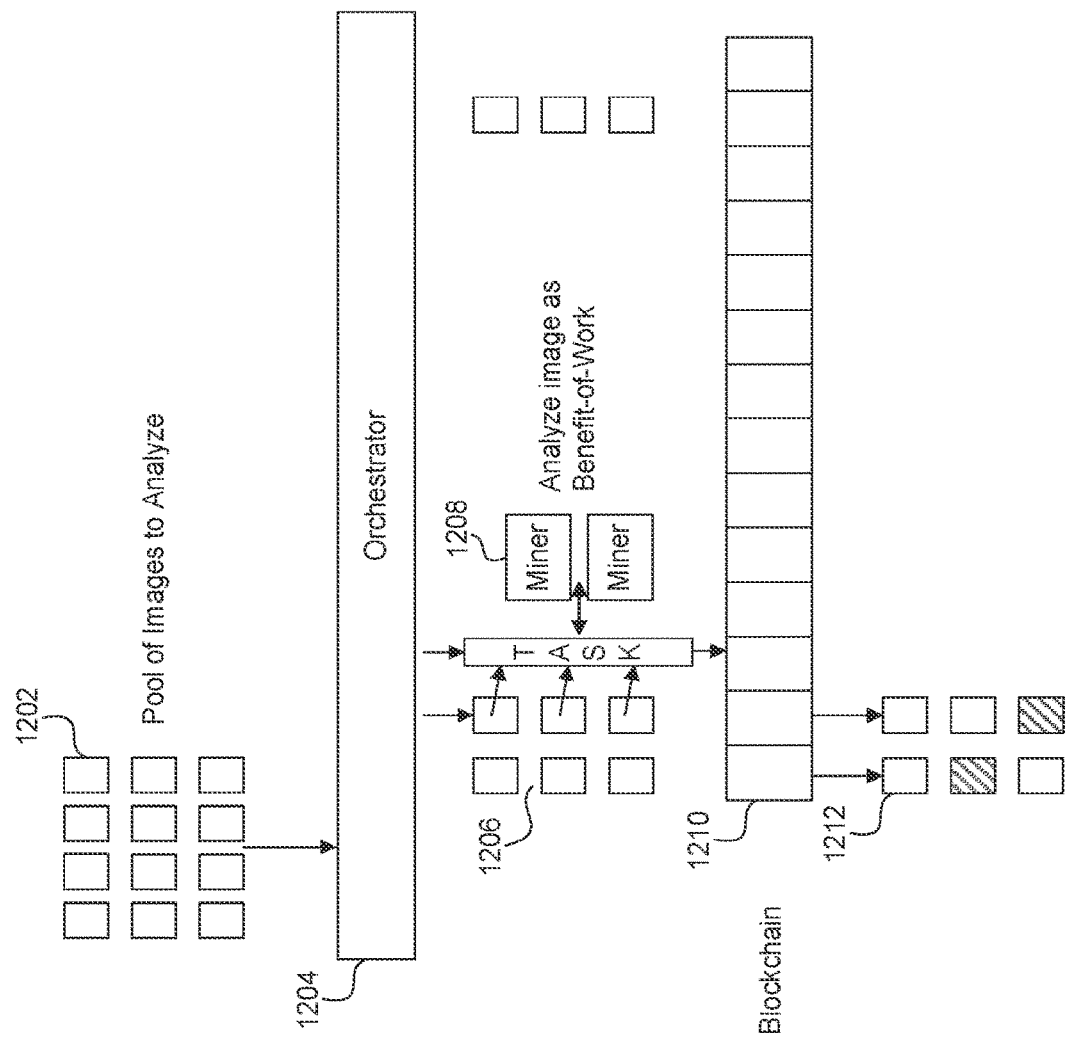
FIG. 12 is a diagram illustrating examples of Benefit-Of-Work and Benefit-Of-Stake.

For instance, if a company has data that needs to be cleansed or files that need to be translated or meta-data indexing that needs to be done on millions of files, that work can actually be accomplished by the blockchain miners as the blockchain grows. FIG. 12 demonstrates Benefit-Of-Work validator network 1200. In this example, the network participants leverage image data in transactions for their operations. The network validation scheme analyzes images as they come into the network in transactions and adds information about the images (size, color range, detected components, etc.). This information is stored along with the source images into the blockchain and provides additional information to the network participants not available in the original transactional inputs. This additional information benefits all network participants and the value of participating in the network increases because of the additional Benefit-Of-Work performed for all transactions.

(7) The capability to leverage sharding of blockchain content for scalability without sacrificing provenance for any particular behavior or blockchain.

(8) The capability to leverage entity ranges and sharding to provide additional length (concatenation) or parallelism (range sharding) to any governed blockchain.

(9) The capability to store blockchain relationships in a graph database,
   a) while maintaining the metadata necessary to construct or reconstruct the relationship between blockchains without reference to the blockchains themselves,
   b) and/or with complete provenance around the notion of the blockchain relationships to each other and the actions and methods by which those relationships were instantiated.

(10) When making use of the methods in (6) above, the systems and methods disclosed herein may gain the capability to leverage embedded, tiny, or other alternate and specialized computer systems to provide mining capabilities, election capabilities, and deliver in the capabilities described in (6) above. These systems may embody these capabilities in hardware, software, or hybrid methods.

Figure 13:
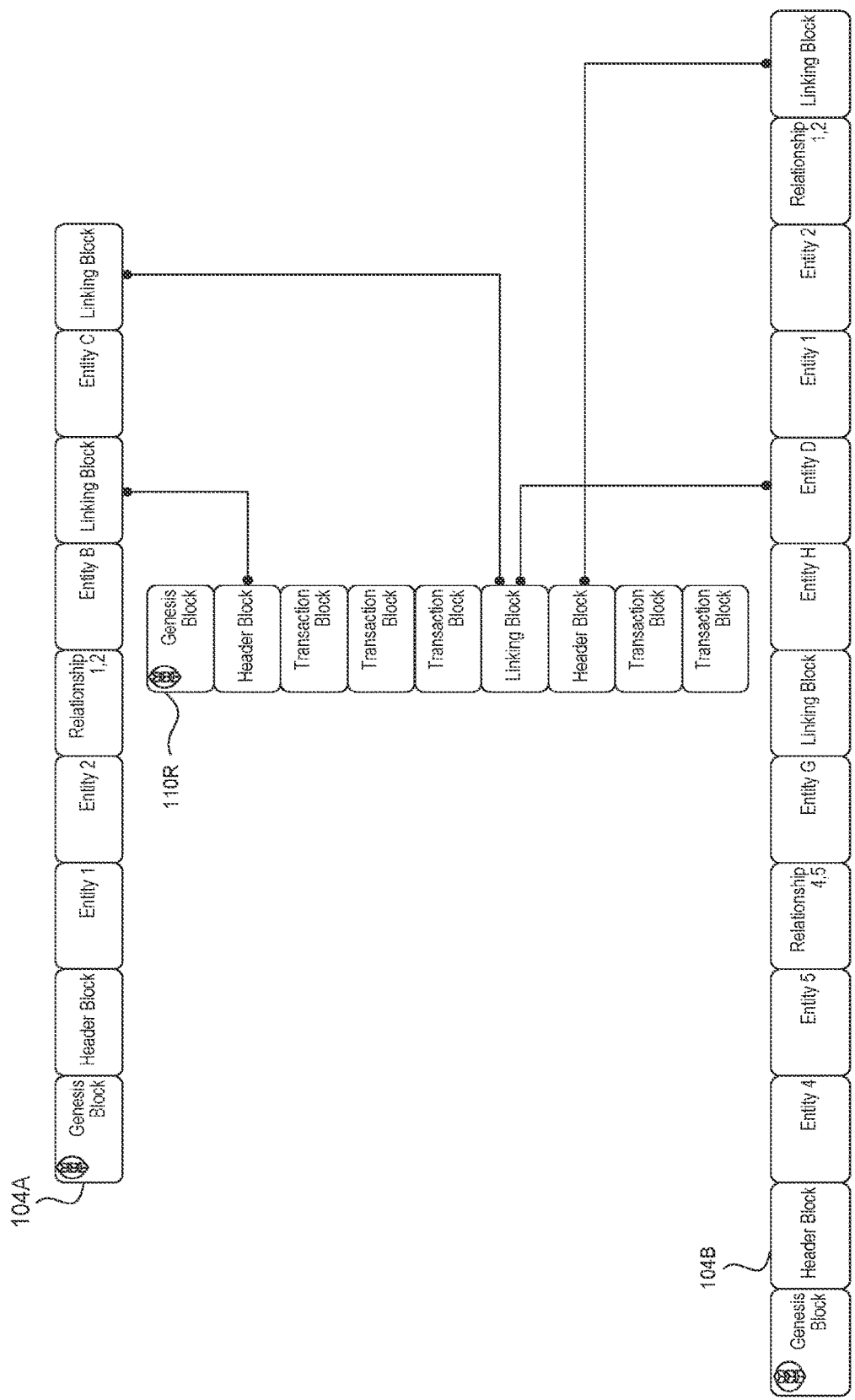
FIG. 13 is a diagram illustrating an example of detached blockchain reassignment.

(11) Embodying detachable blockchains without losing provenance in a larger structure or blockchain of behavior. These detachable blockchains may be completely extracted into other physical embodiments and devices or removed altogether. Once detached, detachable blockchains may be held, archived, or destroyed without regard to their owning chain without losing verifiable provenance. Detachable blockchains may also have their ownership and governance reassigned, e.g., by terminating their previous governance and adding new linking and header blocks to the blockchains involved, indicating this action has occurred. FIG. 13 illustrates detached chain 900, with a reattachment of sub-blockchain 110R from core blockchain 104A to core blockchain 104B. A new linking and header block are added to the sub-blockchain, and new entities added to core blockchain 104B to facilitate referenced and continued transactions on sub-blockchain 110R. One of the key criticisms of distributed ledger technology, including blockchain, is that in cases where destruction, deletion, or removal are mandated (e.g., as by EU Global Data Privacy Regulations (GDPR)), the technology has no good solution by definition. The structure outlined above allows for the destruction, removal, and deletion of data altogether as well as a reassignment of ownership. This is a marked improvement for blockchain technology.

3. Globally Verifiable Unique Identifier Generator

The improvements to the blockchain technologies described above with reference to FIGS. 1 and 8-14 may be leveraged to generate GVUIs at enormous scales in a manner that avoids collisions and allows downstream verification of internally generated GVUIs.

Generally speaking, GVUIs may be used to uniquely identify and track items, files, and other suitable information across computer systems or systems which leverage GVUI verification in physical forms and devices. A GVUI may be created, linked, and associated with a digital photograph, video, or sound file, an avatar or user identity, a digital representation of a real-world object, virtual objects in a digital domain, other GVUIs, and a panoply of other digital files. The problem of creating and cataloguing GVUIs at scale (e.g., hundred, thousands, or millions per second) while avoiding collisions (e.g., creating the same identifier twice) and providing secure (e.g., not hackable or tamperable) verification of previously created GVUIs is a long-standing and widely-known problem (analogous to creating a truly random number generator). The below solution solves this problem while providing the further benefit of being able to assign ownership of the underlying blockchains to separate entities.

The below disclosure will reference several use cases and real-world applications of a GVUI generator. In one merely exemplary use case, a GVUI API may receive a request to create one or more GVUI's, for instance, from a manufacturer of watches. In this merely exemplary scenario, the manufacturer may wish to assign a GVUI to each manufactured watch so that the watches may be tracked digitally upon shipment. The GVUI may be associated with the physical watch throughout the watch's lifespan. The manufacturer may at a later time need to verify that the GVUI is a valid one, i.e., a GVUI that was assigned to a watch at some point in time. For example, the watch owner may bring the watch in for maintenance and a technician may access information about the particular watch. In some embodiments, such a system could access a verification API to verify that the watch's GVUI is valid and could provide the precise moment in time when the GVUI was assigned to that watch or the time the GVUI was created.

In another merely exemplary scenario, the GVUI generator may be harnessed to facilitate the stenographic identification of digital files. For example, the GVUI generator may be used to generate a GVUI to be associated with a digital object, e.g., a skin or specialty weapon in a video game or digital photograph. The GVUI may be embedded in the digital object in a manner that is transparent to the viewer or user of the digital file but that nonetheless accompanies the digital file at the byte-wise level as the digital file is transmitted or stored.

The GVUI generator may also be leveraged to create GVUIs as described in the scenarios depicted in FIGS. 8A-8D. During the "Allocate Chain" step described in FIGS. 8A-8D, a system employing N-Dimensional blockchain structure 100 along with graph database technologies may use the GVUI creation system to create a GVUI for a sub-blockchain, such as sub-blockchains 110, in an N-Dimensional blockchain structure. Such a GVUI may be written to, for example, a header block, such as header blocks 108, in a governance blockchain, such as governance blockchain 102 as depicted in FIG. 1 to ensure that the governance block is safe and provable.

In another merely exemplary scenario, a user may access a GVUI generator from their phone to generate GVUIs for use as passwords. Countless additional scenarios and use cases may be constructed, and one skilled in the relevant art(s) will appreciate that GVUIs may be used in and applied to a wide-array of such scenarios.

Figure 2:
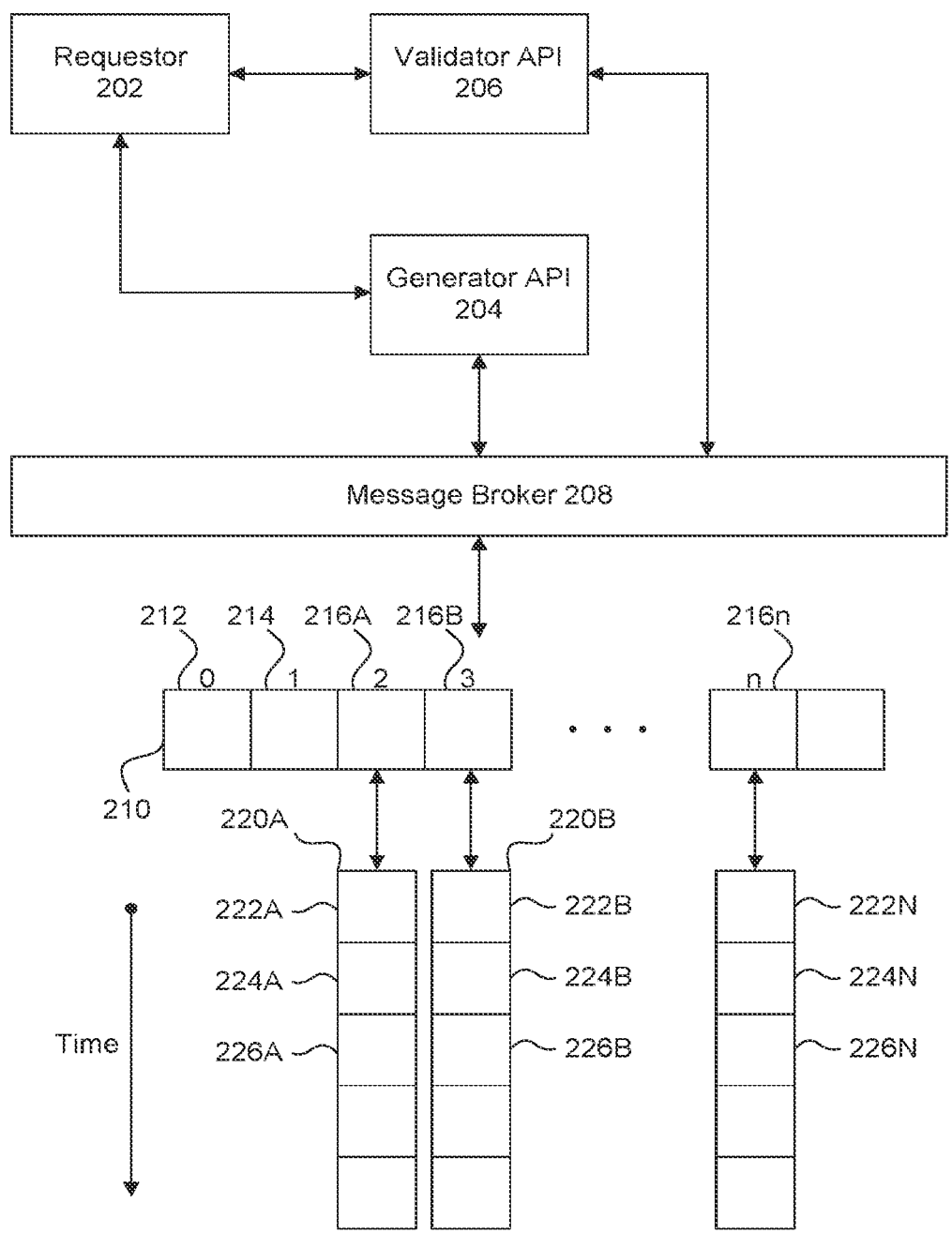
FIG. 2 is a block diagram of a Globally Verifiable Unique Identifier (GVUI) generating system including a 2-dimensional blockchain structure, according to some embodiments.

FIG. 2 is a block diagram of a GVUI generating system 200 including a 2-dimensional blockchain structure, according to some embodiments. Any operation herein may be performed by any type of structure in the diagram, such as a module or dedicated device, in hardware, software, or any combination thereof. Any block in the block diagram of FIG. 2 may be regarded as a module, apparatus, dedicated device, processor, engine, state machine, application, functional element, or related technology capable of and configured to perform its corresponding operation(s) described herein. System 200 may include requestor 202, generator API 204, validator API 206, message broker 208, governance chain 210, and blockchains 220.

Requestor 202 may be a personal digital assistant, desktop workstation, laptop or notebook computer, netbook, tablet, smart phone, mobile phone, smart watch or other wearable, appliance, part of the Internet-of-Things, part of the Internet-of-Objects and/or embedded system, to name a few non-limiting examples, or any combination thereof. Requestor 202 may be an individual, entity, user, customer, etc. Requestor 202 may be a human being, but requestor 202 may also be an artificial intelligence construct, computer system, an application programming interface, or other suitable digital actor. For example, requestor 202 may be a manufacturer's automated computer system that requests one or more GVUIs to be associated with a manufactured object while creating the object. In some use cases, requestor 202 may request one or few GVUIs at a time, but in other scenarios requestor 202 may request thousands or millions of GVUIs per minute or second (especially in the user case of assigning GVUIs to digital objects). Additionally, more than one requestor 202 may simultaneously access generator API 204.

Generator API 204 may allocate a GVUI to a pool of available GVUIs. Generator API 204 may retrieve a wallet token, unique tag, etc. from a message queue or other supporting components described in further detail below. Generator API 204 may employ a suitable cryptographically re-creatable methodology to generate a GVUI based on the unique tag, a retrieved blockchain identifier and/or a wallet token. Generator API 204 may then send the GVUI to requestor 202. In some alternate embodiments, generator API 204 may store records describing generated GVUIs, but this is not strictly necessary within the context of this disclosure. Generator API 204 may receive a request for GVUIs, for example, through a call such as "get_gvui( )." In some embodiments, the call may further specify a number of GVUIs to retrieve, e.g., one, ten, twenty thousand, one million, etc. The specific implementation of generator API 204 may vary across embodiments and according to various use cases. Generator API 204 is described in further detail below with reference to FIG. 5.

Validator API 206 may be employed within system 200 to verify that generator API 204 previously created a GVUI. Validator API 206 may receive a request from requestor 202 or other suitable person, entity, computer system, etc. For example, validator 206 may receive a call to verify_gvui( ). Such a call may further specify the GVUI to verify by including the GVUI as a parameter. Validator API 206 may employ an appropriate cryptographic method to deconstruct the GVUI back into its composite elements, i.e., a blockchain identifier, a unique tag, and/or a wallet token. Validator API 206 may then search the appropriate blockchain for a block containing the unique tag and/or wallet token. When the block is found in the blockchain, validator API 206 may return a success indicator, thus verifying that the GVUI was previously created by system 200. If no block is found in the blockchain for that GVUI, then the GVUI was not created by the system and a fail indicator may be returned to requestor 202. Validator API 206 is described in further detail below with reference to FIG. 5.

Validator API 206 and/or generator API 204 (or other similarly positioned API) may provide further downstream functionalities for created GVUIs. For example, validator API 206 may provide a capability to accelerate/decelerate how quickly messages are sent to a message queue, e.g., how quickly the miners in the underlying blockchains create additional blocks. Generator API 206 may provide a delegation function that allows other entities to create GVUIs. Generator API 206 may provide a manner of retiring, revoking, deleting, and detaching a blockchain among blockchains 220, e.g., blockchain 220A, blockchain 220B, etc.

Message broker 208 may also be referred to as an event bus, integration broker, or interface engine and may serve as a translation intermediary for messages in a publication/subscription protocol. A watcher or shim may publish messages to message broker 208 indicating that a set of GVUIs was mined in a block in a blockchain. Message broker 208 may then be accessed or engaged by generator API 204 to retrieve one or more GVUIs or unique tags in blockchains 220.

Governance chain 210 may store information about a plurality of blockchains (described below as blockchains 220) employed by system 200 to create GVUIs. Governance chain 210 may include genesis block 212, header block 214, and linking blocks 216. Governance chain 210 may also store rules and parameters guiding the behavior of the underlying two-dimensional blockchain system.

Genesis block 212 may be the first block in governance chain 210. In some embodiments, genesis block 212 may be numbered as 0, but in others genesis block 212 may be numbered as 1 or using another suitable number or name. Genesis block 212 is unique compared to and distinguishable from other blocks in governance chain 210 because genesis block 212 does not reference a previous block.

Header block 214 may be one or more blocks specifying the behavior of governance chain 210 and the other blockchains in the two-dimensional blockchain structure. For example, header block 214 may specify version numbers, timestamps, parameters, and programmatically defined rules to apply in governance blockchain 210 and underlying blockchains.

Linking blocks 216 may contain information linking governance chain 210 to the underlying blockchains (described below as blockchains 220). Linking blocks 216 may be shards to other chains. Linking blocks 216 may contain pointers to the underlying blockchains holding the blockchain identifier for the pointed-to blockchain. Linking blocks 216 are described in further detail above with reference to FIG. 10.

Blockchains 220 may be one or more blockchains employed by system 200 to generate and store blockchain accounts, GVUIs, and associated namespaces, cryptographical components like keys, signatures, and keyrings, and metadata. For the purposes of this disclosure, we refer to all of these pieces as GVUI components. A blockchain in blockchains 220 may be any suitable implementation of a blockchain data structure that provides for provenance, is tamper-proof, and creates an append-only, immutable data format after consensus algorithms place the next block into the accepted blockchain. One or more miners may write additional blocks to blockchains 220 periodically with the blocks containing additional batches of GVUI components. A watcher or shim may monitor blockchains 220 and publish a message to message broker 208 upon the creation of additional GVUI components. Blockchains 220 may include genesis blocks 222, header blocks 224, and blocks 226.

Blocks 226 may be written by miners into blockchains 220. Blocks 226 may store GVUI components to be published by a watcher to message broker 208 to be gathered by generator API 204 in the construction of a GVUI.

Figure 3:
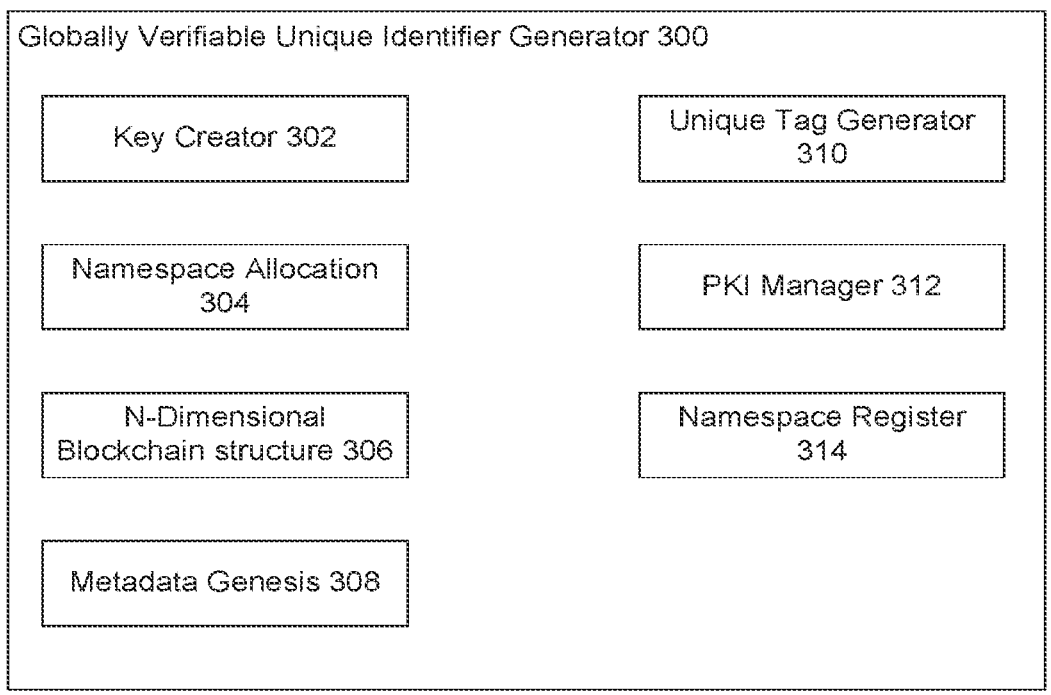
FIG. 3 is a block diagram of a GVUI generator architecture, according to some embodiments.

FIG. 3 is a block diagram of GVUI generator 300, according to some embodiments. Any operation herein may be performed by any type of structure in the diagram, such as a module or dedicated device, in hardware, software, or any combination thereof. Any block in the block diagram of FIG. 3 may be regarded as a module, apparatus, dedicated device, processor, engine, state machine, application, functional element, or related technology capable of and configured to perform its corresponding operation(s) described herein. GVUI generator 300 may include key creator 302, namespace allocator 304, N-Dimensional blockchain structure 306, metadata genesis 308, unique tag generator 310, PKI manager 312, and namespace register 314. Collectively, this block diagram may constitute GVUI components for consumption, publication, storage, verification, retrieval, and the like.

Key creator 302 may be module, function, component, micro-service, etc. used to generate wallets, private keys, salts, and other cryptographic tools. For example, key creator 302 may be a KEYTHEREUM wallet creator that generates a wallet and public and private key(s) associated with the wallet. In an embodiment, key creator 302 may constantly create these unverifiable IDs (wallets, keys, salts, etc.) for use by GVUI generator 300. In this embodiment, when key creator 302 creates an unverifiable ID that is not used by GVUI generator 300, this unverifiable ID is merely disregarded. In another embodiment, key creator 302 may be co-extensive with a GVUI generating system, such as GVUI generating system 200 described in FIG. 2.

Namespace allocator 304 may be a module, function, component, micro-service, etc. running on a miner or with other appropriate access to a miner. Namespace allocator 304 may access N-Dimensional blockchain structure 306, which is described below, to add/write/append/record information to N-Dimensional blockchain structure 306. In one embodiment, namespace allocator 304 may apportion appropriate namespaces for each customer or user, such that a GVUI is guaranteed to be unique within that namespace.

N-Dimensional blockchain structure 306 may be an instance of a multi-dimensional, linked blockchain structure that is described above with reference to FIG. 1. N-Dimensional blockchain structure 306 may provide provenance and the ability to verify that a namespace was assigned to a particular namespace. N-Dimensional blockchain structure 306 may include a wallet token created by key creator 302. Additionally, N-Dimensional blockchain structure 306 may be enhanced by recording metadata (described in further detail below) to facilitate the verification of a GVUI within a namespace.

Metadata genesis 308 may be a module, function, component, micro-service, etc. responsible for compiling metadata and adding/inserting/recording the metadata on N-dimensional blockchain structure 306. In an embodiment, the metadata may include: a wallet token, a genesis block ID, a GPG keyring (or other suitable PKI information), a sub-key clock algorithm, a key-pair fingerprint, a namespace, and other suitable metadata.

Unique tag generator 310 may generate a unique number or address location, e.g., a non-duplicative 128-bit (or other suitable sized) number. Unique tag generator 310 may generate a unique tag one-at-at-time or in bulk in response to a request from metadata genesis 308. One skilled in the relevant art(s) will appreciate that a panoply of solutions exist to provide a unique tag as described within this disclosure.

PKI manager 312 may generate and provide public and private key information that is needed to verify a GVUI. In one embodiment, PKI manager 312 may generate a GPG keyring, however, other cryptographic approaches may be used with similar effect. PKI manager 312 may create a master, subkey, fingerprint, and other suitable key information and pass this information to metadata genesis 308 for insertion into N-Dimensional blockchain structure 306.

Namespace register 314 may record namespaces created and used within GVUI generator 300. Namespace register 314 may facilitate downstream functionalities, for example, verifying that a GVUI exists in a particular namespace or across all namespaces. For example, in one embodiment, a unique namespace may be provided, recorded, and consulted across customers and a GVUI may be globally verifiable within the context of that namespace.

Any or all of the components in the GVUI Generator 300 diagram may be persisted, validated, verified, disregarded, or employed as a GVUI component on blockchains as represented in 226 or other systems making use of GVUI components as required.

Figure 4:
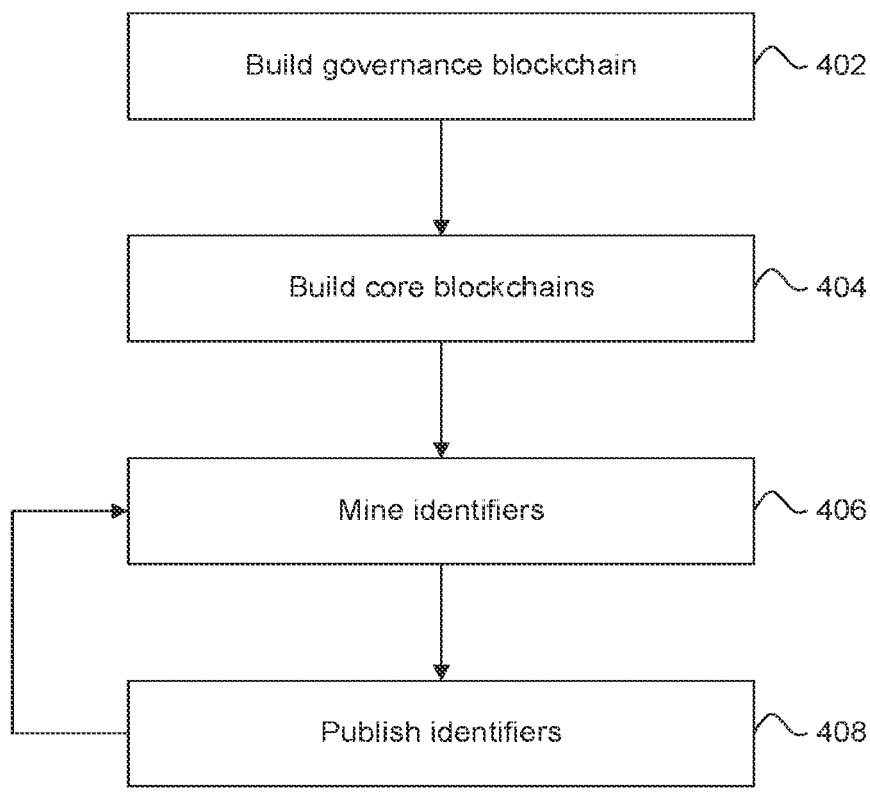
FIG. 4 is a flowchart illustrating a method of initializing a 2-dimensional blockchain structure to publish identifiers to a messaging queue, according to some embodiments.

FIG. 4 is a flowchart illustrating method 400 of initializing a 2-dimensional blockchain structure leveraged for provenance and verifiability when publishing GVUIs to a messaging queue, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, governance chain 210 may be initiated and built. For example, genesis block 212 may be mined to initiate governance chain 210. Header block 214 may be built including appropriate rules (in the form of structured code), parameters (to apply to the structured code), and other suitable information (versioning information, protocol describers, etc.). For example, governance chain 210 may be inserted directly into the chain at block 1 after the genesis block.

In 404, blockchains 220 may be initiated and built. A GVUI may be generated for the blockchain. Genesis blocks 222 may be mined. Header blocks 224 may be created with a pointer back to an appropriate linking block among linking blocks 216 in governance chain 210.

In 406, a miner may begin mining blocks in blockchains 220. The rate at which miners perform this behavior and the rules that the miner may create blocks may be specified in header blocks 224 and/or header block 214 of governance chain 210. A block mined by the miner may include a number of GVUIs, the exact nature of which may be specified by the aforementioned rules. The GVUIs, however, are unique within a particular blockchain in blockchains 220. GVUIs may be generated either through intrinsic blockchain mining behaviors specific to a particular blockchain implementation or through any external mechanism which may present GVUIs which can be included and validated by the mining process. In some embodiments, an GVUI may be generated through account creation on the specific blockchain and chosen sequentially or in ranges as accounts are instantiated. In some embodiments, external methods such as an GVUI generator may create any number of unattached GVUIs which are attached and validated to a particular blockchain through the mining process of sealing blocks.

In 408, a watcher may see that a miner added a block to blockchains 220 in 406. The watcher may be configured to publish to message broker 208 a message of the available number of GVUIs along with a blockchain identifier associated with a particular blockchain in blockchains 220. The watcher may also notify miners that the rate of GVUI creation may need to be adjusted and may signal the miners to adjust their behavior accordingly. This notification may occur through messaging, signaling, request/response, or any other mechanism that might be understood by a person of ordinary skill in the art(s).

In this fashion, messages are constantly being published into message broker 208 that indicate the availability of a quantity of GVUIs along with a blockchain identifier on which those GVUIs are stored. One skilled in the art will appreciate that the frequency/rate of publication/bulk of these messages may be adjusted depending on how many blockchains are deployed within blockchains 220 as well as upon the rules and parameters specified in governance chain 210. Generally speaking, limitations on scaling the GVUI solution requires only that the rate of publishing for new GVUIs matches or exceeds the rate of GVUI consumption. The downstream use of this message broker 208 in the creation of a GVUI is described next with reference to FIG. 5.

Figure 5:
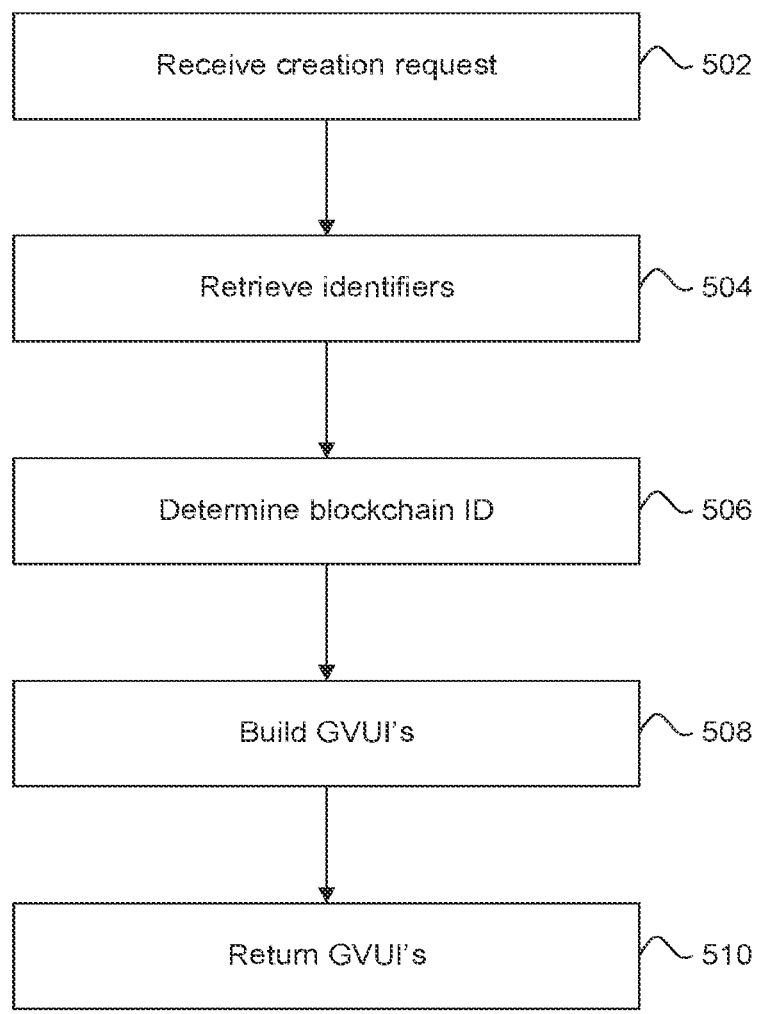
FIG. 5 is a flowchart illustrating a method of retrieving unique components from a messaging queue to generate GVUIs, according to some embodiments.

FIG. 5 is a flowchart illustrating a method of retrieving unique tags from a messaging queue to generate GVUIs, according to some embodiments. Method 500 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, generator API 204 may receive a request from requestor 202 to create one or more GVUIs. For example, such a request may take the form of "get_gvui(int x)", where "x" specifies a number of GVUIs to create. In one example, a manufacturer may request a batch of GVUIs to associate with a product being created. In another example, generator API 204 may receive a request to create a block in a governance blockchain in a sharded blockchain.

In 504, generator API 204 may retrieve a batch of unique tags. A batch of unique tags may be retrieved using a variety of approaches, for example a unique tag generating tool. Moreover, generator API 204 may use any suitable messaging protocol to retrieve the batch of GVUIs.

In 506, generator API 204 may determine a blockchain identifier associated with the batch of GVUIs. In some embodiments, the blockchain identifier may be the same across all of the retrieved GVUIs. In other embodiments, generator API 204 may retrieve GVUIs from across blockchains 220, perhaps randomly, to optimize the creation of GVUIs by distributing evenly the creation responsibilities for a given request. In these embodiments, the blockchain identifier may vary across the retrieved GVUIs and an appropriate data structure may be employed to store these associations.

In 508, generator API 204 may create GVUIs based on the retrieved unique tags and blockchain identifiers. A number of cryptographic methods may be employed to create the GVUI using the retrieved unique tag and the blockchain identifier as keys or input to the cryptographic methods; one such embodiment is described below with reference to FIG. 6. However, the encryption employed may be reversible to facilitate verification steps described below with reference to FIG. 7.

In 510, generator API 204 may return the GVUIs generated in 508 to requestor 202 via an API call or other suitable return message. In this fashion, requestor 202 may receive the requested number of GVUIs in a fashion that scales to extreme levels and can satisfy high-demand, high-bulk scenarios and use cases. The retrieved GVUIs avoid collisions (i.e., name conflicts) and are verifiable after-the-fact, as described below with reference to FIG. 6.

Figure 6:
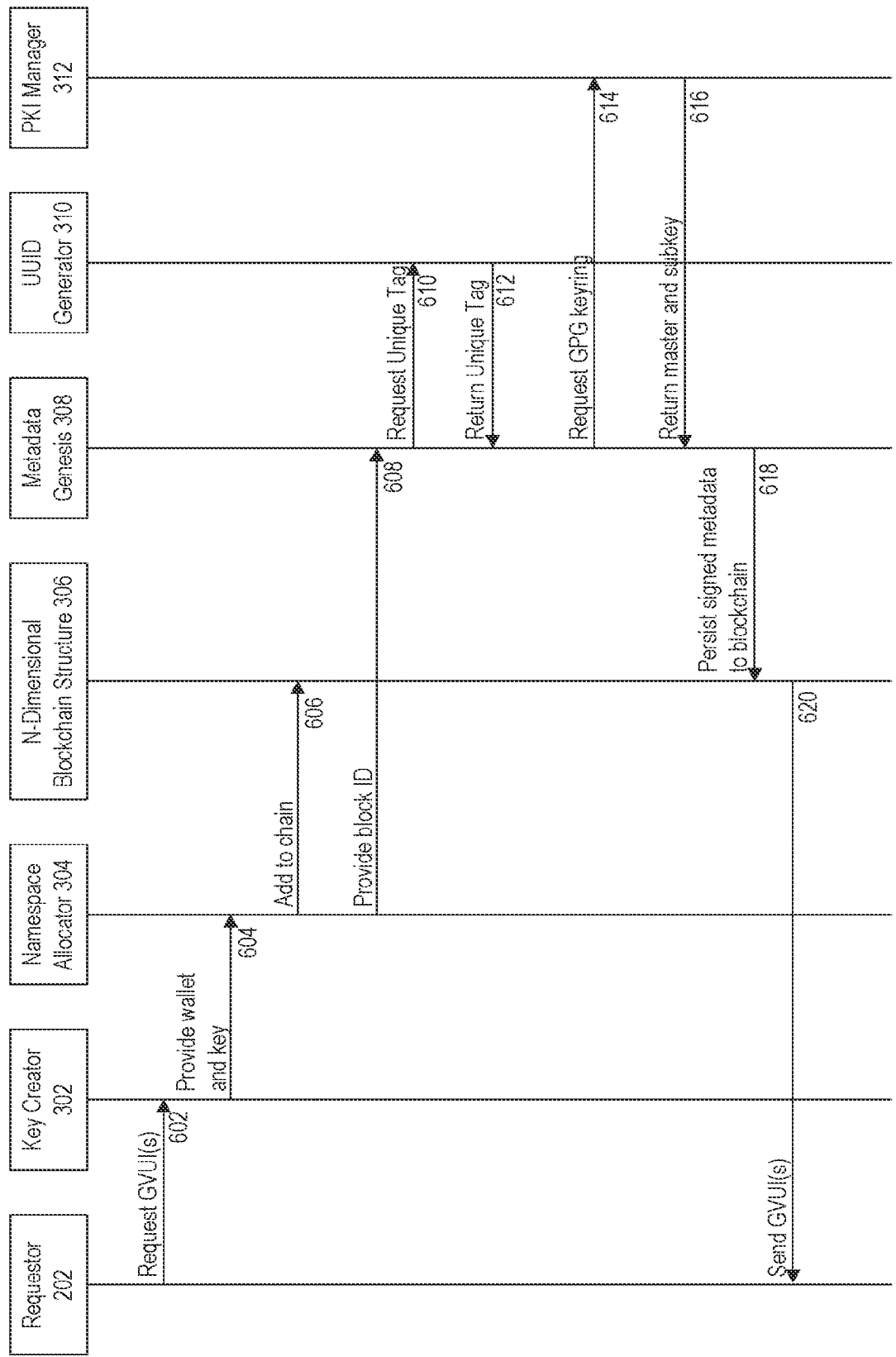
FIG. 6 is a flowchart illustrating an exemplary method of creating GVUIs, according to some embodiments.

FIG. 6 is a flowchart illustrating method 600 of creating GVUIs, according to some embodiments. Method 600 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, requestor 202 may request GVUI(s) from GVUI generator 300. Requestor 202 may request one GVUI or a batch of GVUI(s) and receive the GVUI(s) from GVUI generator 300 in real-time or near-real-time. Requestor 202 may provide an existing identifier signifying the ownership of additional GVUIs (namespace), a customer identifier, and other suitable information. For example, a manufacturer of watches may send a request to create/receive one or more GVUI's, as part of the manufacturing process, ensuring that each watch may be tracked digitally upon shipment and verified as part of future transactions.

In 604, GVUI generator 300 may initiate key creator 302 to create a new wallet and private key. Key creator 302 may create a new wallet token, which will be referred to below as the account number.

In 606, GVUI generator 300 may initiate namespace allocator 304 to write the account number received in 604 into N-dimensional blockchain structure 306 as a genesis block. In response, namespace allocator 304 may receive a genesis block identifier from N-Dimensional blockchain structure 306.

In 608, GVUI generator 300 may provide the genesis block identifier to metadata genesis 308. This genesis block identifier may be used in subsequent steps to identify an appropriate genesis block(s) in N-Dimensional blockchain structure 306.

In 610, metadata genesis 308 may engage unique tag generator 310 to create a unique tag. Multiple unique tags may be generated in bulk by leveraging any suitable solution for generating a unique tag.

In 612, metadata genesis 308 may receive the unique tag(s) from unique tag generator 310.

In 614, metadata genesis 308 may request a GPG keyring, or other suitable PKI-facilitating entity, from PKI manager 312. PKI manager 312 may generate a GPG keyring or set of cryptographic keys using another suitable approach. For example, metadata genesis 308 may receive a variety of keys, e.g., a private key, public key, and sign-in key.

In 616, PKI manager 312 may return the key information generated in 614 to metadata genesis 308 for inclusion in the metadata. For example, in an embodiment, PKI manager may return a master, subkey, and fingerprint to metadata genesis 308.

In 618, metadata genesis 308 may compile the metadata. Metadata 308 may record the unique tag received in 612 to the N-dimensional blockchain structure 306 alongside the wallet ID added to the chain in 606. Metadata genesis 308 may record the GPG keyring information received in 616 into the metadata. Metadata genesis 308 may also insert a subkey clock algorithm. Metadata genesis 308 may also record the namespace into the metadata. Metadata genesis 308 may then write a transaction into N-dimensional blockchain structure 306. Thus, the unique tag received in 612 has been signed by a suitable cryptographic approach (e.g., GPG) in step 616, which is written into N-dimensional blockchain structure 306 in association with the account number (wallet identifier).

In 620, requestor 202 may receive the GVUI(s) from GVUI generator 300. Thus, later verification of the GVUI may be provided to requestor 202 for future transactions. A suitable cryptographic method (e.g., GPG) verifies the GVUI while the N-dimensional blockchain structure 306 provides the storage mechanism supplying an appropriate key using key to provide to the cryptographic method. By storing the cryptographic digital signatures on N-dimensional blockchain structure 306, the GVUI may be globally verified for a namespace at a later time. For instance, a search of N-dimensional blockchain structure 306 may be conducted to examine the date of the transaction and the account number to retrieve the set of sign-in keys and a namespace signed by those keys. Using this information, the GVUI may be globally verified to prove that GVUI generator 300 created this transaction at this point in time in a manner that is cryptographically secure and in the namespace provided at creation time.

Figure 7:
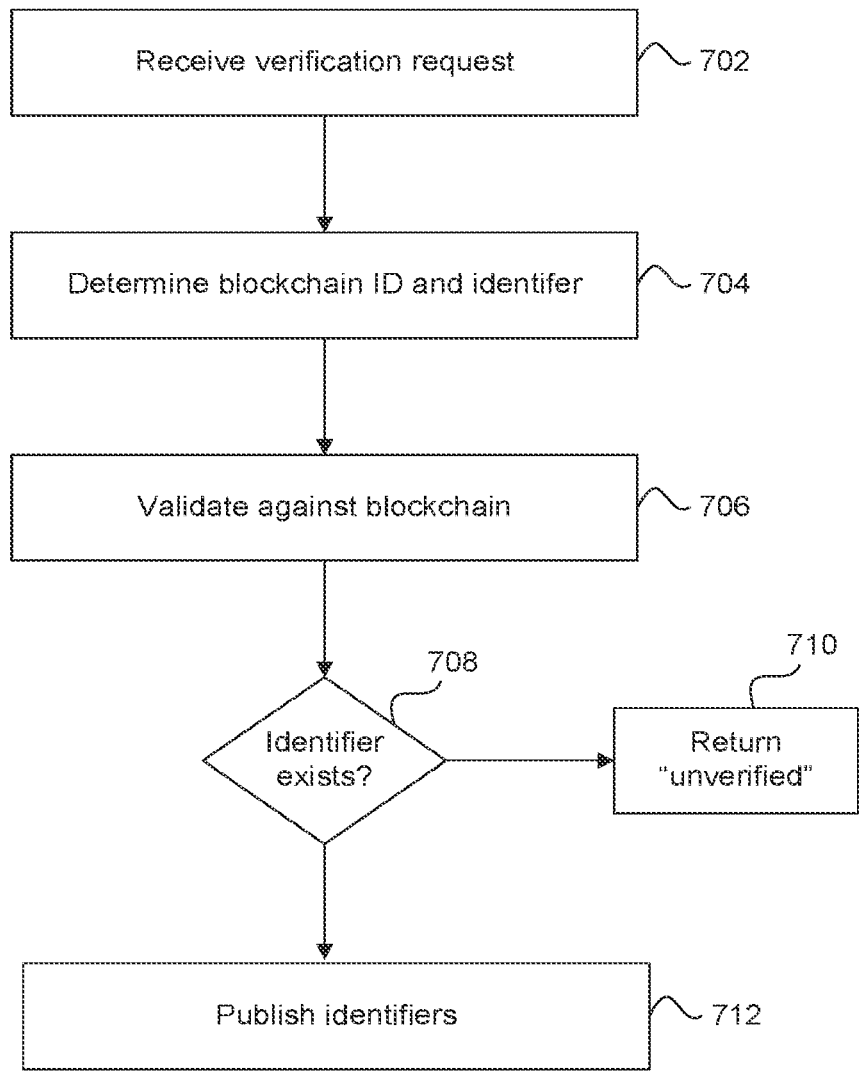
FIG. 7 is a flowchart illustrating a method of verifying internally created GVUIs, according to some embodiments.

FIG. 7 is a flowchart illustrating a method of verifying previously created GVUIs, according to some embodiments. Method 700 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 702, validator API 206 may receive a request from requestor 202 to verify a GVUI. For example, such a request may take the form of "verify_gvui(id x)", where "x" specifies a GVUI to verify. In other cases, validator API 206 may receive an array or other data structure of GVUIs and verify all of the GVUIs simultaneously.

In 704, validator API 206 may employ an appropriate cryptographic method to deconstruct the GVUI back into its composite elements, i.e., the blockchain identifier, the unique tag, and/or the wallet token. Validator API 206 may unwrap the cryptographic object from step 408 using appropriate cryptographic methods to retrieve relevant GVUI components and return validator API 206 a blockchain identifier and a unique tag.

In 706, validator API 206 may access the appropriate blockchain via appropriate logic through governance chain 210 based on the blockchain identifier determined in 704. Validator API 206 may search the appropriate blockchain to see if the unique tag exists in a block in the chain.

In 708, validator API 206 may determine if the unique tag exists in a block in the searched chain. If the unique tag does not exist, then method 700 may proceed to 710. Otherwise, method 700 may proceed to 712.

In 710, validator API 206 may return a result to requestor 202 indicating that the GVUI was unverified. A GVUI that is unverified was not created within system 200. In other embodiments, validator API 206 may "revoke" a GVUI based on a specific request from requestor 202, e.g., a call to "revoke_gvui( )."

In 712, generator API 206 may return a result to requestor 202 indicating that the GVUI was verified, i.e., that the GVUI was created in system 200. In embodiments where validator API 206 is validating multiple GVUIs, an appropriate data structure may be employed to return a series of "unverified" and "verified" responses in 710 and 712.

FIG. 15 illustrates an example computer system that may be used to implement various embodiments of the disclosure. Various embodiments can be implemented, for example, using one or more computer systems, such as computer system 1500 shown in FIG. 15. Various embodiments may be implemented using a plurality of networked computer systems, such as the Internet. Such a network may include a plurality of computer systems, servers, mobile devices, etc. that are geographically distributed. Computer system 1500 may be any well-known computer capable of performing the functions described herein, such as computers available from INTERNATIONAL BUSINESS MACHINES, APPLE, SUN, HP, DELL, SONY, TOSHIBA, etc. Computer system 1500 may be a server or a mobile device.

Computer system 1500 includes one or more processors (also called central processing units, or CPUs), such as a processor 1504. Processor 1504 is connected to a communication infrastructure or bus 1506.

Computer system 1500 may include user input/output device(s) 1503, such as monitors, keyboards, pointing devices, touch screens, etc., which communicate with communication infrastructure 1506 through user input/output interface(s) 1502.

Computer system 1500 may include a main or primary memory 1508, such as random access memory (RAM). Main memory 1508 may include one or more levels of cache. Main memory 1508 has stored therein control logic (i.e., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 may include a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to an exemplary embodiment, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

In an embodiment, a tangible apparatus or article of manufacture comprising a tangible computer useable or readable medium having control logic (software) stored thereon is also referred to herein as a computer program product or program storage device. This includes, but is not limited to, computer system 1500, main memory 1508, secondary memory 1510, and removable storage units 1518 and 1522, as well as tangible articles of manufacture embodying any combination of the foregoing. Such control logic, when executed by one or more data processing devices (such as computer system 1500), causes such data processing devices to operate as described herein. The methods and flow diagrams disclosed here, including those shown in the Figures, may be implemented as control logic or instructions stored on a non-transitory computer readable medium, which, when executed, cause one or more processors to perform the control logic or instructions.

It is to be appreciated that the Detailed Description section is intended to be used to interpret the claim(s).

The disclosed embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the disclosed embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method, comprising:
   in response to a request from a requestor to create a globally verifiable unique identifier (GVUI), retrieving, by one or more processors, a wallet token and a blockchain identifier from a message broker, wherein the blockchain identifier identifies a blockchain in an N-Dimensional blockchain structure;
   generating, by the one or more processors, metadata comprising the wallet token and one or more cryptographic keys;
   writing, by the one or more processors, the metadata to the blockchain in the N-Dimensional blockchain structure identified by the blockchain identifier;
   generating, by the one or more processors, the GVUI based on the wallet token;
   sending, by the one or more processors, the GVUI to the requestor to embed in a digital object; and
   providing, by the one or more processors, a verifier service to subsequently verify an authenticity of the GVUI embedded in the digital object using the metadata.

2. The method of claim 1, further comprising:
   receiving, by the one or more processors, the request in association with the digital object;
   embedding, by the one or more processors, the GVUI in the digital object; and
   sending, by the one or more processors, the digital object to the requestor.

3. The method of claim 1, further comprising:
   receiving, by the one or more processors, the request from a mobile application running on a mobile device, wherein the mobile application generates a unique password for the requestor.

4. The method of claim 1, further comprising:
   receiving, by the one or more processors, the request in a manufacturing process that creates a physical object; and
   associating, by the one or more processors, the GVUI and a time of creation with the physical object.

5. The method of claim 1, further comprising:
   providing, by the one or more processors, a delegator function that allows an external entity to create the GVUI.

6. The method of claim 1, wherein the one or more cryptographic keys comprise a public key and a private key, further comprising:
   creating, by the one or more processors, the public key and the private key using a GNU Privacy guard function.

7. The method of claim 1, wherein a first blockchain in the N-dimensional blockchain structure has a different blockchain implementation from a second blockchain in the N-dimensional blockchain structure.

8. A system comprising:
   a memory; and
   at least one processor coupled to the memory configured to:
   in response to a request from a requestor to create a globally verifiable unique identifier (GVUI), retrieve a wallet token and a blockchain identifier from a message broker, wherein the blockchain identifier identifies a blockchain in an N-Dimensional blockchain structure;

generate metadata comprising the wallet token and one or more cryptographic keys;

write the metadata to the blockchain in the N-Dimensional blockchain structure identified by the blockchain identifier;

generate the GVUI based on the wallet token;

send the GVUI to the requestor to embed in a digital object; and provide a verifier service to subsequently verify an authenticity of the GVUI embedded in the digital object using the metadata.

9. The system of claim 8, the at least one processor further configured to:

receive the request in association with the digital object;

embed the GVUI in the digital object; and send the digital object to the requestor.

10. The system of claim 8, the at least one processor further configured to:

receive the request from a mobile application running on a mobile device, wherein the mobile application generates a unique password for the requestor.

11. The system of claim 8, the at least one processor further configured to:

receive the request in a manufacturing process that creates a physical object; and associate the GVUI and a time of creation with the physical object.

12. The system of claim 8, the at least one processor further configured to:

provide a delegator function that allows an external entity to create the GVUI.

13. The system of claim 8, wherein the one or more cryptographic keys comprise a public key and a private key, the at least one processor further configured to:

create the public key and the private key using a GNU Privacy guard function.

14. The system of claim 8, wherein a first blockchain in the N-dimensional blockchain structure has a different blockchain implementation from a second blockchain in the N-dimensional blockchain structure.

15. A non-transitory computer-readable device having instructions stored thereon that, when executed by at least one computing device, cause the at least one computing device to perform operations comprising:

in response to a request from a requestor to create a globally verifiable unique identifier (GVUI), retrieving a wallet token and a blockchain identifier from a message broker, wherein the blockchain identifier identifies a blockchain in an N-Dimensional blockchain structure;

generating metadata comprising the wallet token and one or more cryptographic keys;

writing the metadata to the blockchain in the N-Dimensional blockchain structure identified by the blockchain identifier;

generating the GVUI based on the wallet token;

sending the GVUI to the requestor to embed in a digital object; and providing a verifier service to subsequently verify an authenticity of the GVUI embedded in the digital object using the metadata.

16. The non-transitory computer-readable device of claim 15, the operations further comprising:

receiving the request in association with the digital object;

embedding the GVUI in the digital object; and sending the digital object to the requestor.

17. The non-transitory computer-readable device of claim 15, the operations further comprising:

receiving the request from a mobile application running on a mobile device, wherein the mobile application generates a unique password for the requestor.

18. The non-transitory computer-readable device of claim 15, the operations further comprising:

receiving the request in a manufacturing process that creates a physical object; and associating the GVUI and a time of creation with the physical object.

19. The non-transitory computer-readable device of claim 15, the operations further comprising:

providing a delegator function that allows an external entity to create the GVUI.

20. The non-transitory computer-readable device of claim 15, wherein the one or more cryptographic keys comprise a public key and a private key, the operations further comprising:

creating the public key and the private key using a GNU Privacy guard function.

* * * * *